(12) United States Patent
Roberts et al.

(10) Patent No.: US 12,187,334 B2
(45) Date of Patent: Jan. 7, 2025

(54) CLOSED CASE CART

(71) Applicant: InterMetro Industries Corporation, Wilkes-Barre, PA (US)

(72) Inventors: Carey Alan Roberts, Shavertown, PA (US); Jeffrey C. Olson, Dallas, PA (US); David J. Salus, Shavertown, PA (US); Vinayak Tanaji Narvekar, Kolhapur (IN); Bhavin Kumarbhai Dodiya, Ahmednagar (IN); Michael Joseph Grochowski, Mountain Top, PA (US); Robert R. Steele, Sweet Valley, PA (US); Douglas Kaminski, West Wyoming, PA (US); Adam Leonard Reggie, Wyoming, PA (US); Vishal Kundan Waghmare, Pune (IN)

(73) Assignee: InterMetro Industries Corporation, Wilkes-Barre, PA (US)

(*) Notice: Subject to any disclaimer, the term of this patent is extended or adjusted under 35 U.S.C. 154(b) by 448 days.

(21) Appl. No.: 17/668,582

(22) Filed: Feb. 10, 2022

(65) Prior Publication Data

US 2022/0281499 A1 Sep. 8, 2022

(30) Foreign Application Priority Data

Feb. 10, 2021 (IN) ............................. 202121005707

(51) Int. Cl.
*B62B 3/00* (2006.01)
(52) U.S. Cl.
CPC ............ *B62B 3/004* (2013.01); *B62B 3/003* (2013.01); *B62B 2301/044* (2013.01); *B62B 2301/08* (2013.01)
(58) Field of Classification Search
CPC ... B62B 3/004; B62B 3/003; B62B 2301/044; B62B 2301/08; B62B 3/008; G09F 3/20;
(Continued)

(56) References Cited

U.S. PATENT DOCUMENTS

| 2,948,798 A | 8/1960 | Ness |
| 4,652,062 A | 3/1987 | Greenwood |

(Continued)

FOREIGN PATENT DOCUMENTS

| CN | 111845873 A | * 10/2020 | ............. B62B 3/003 |
| DE | 102016101490 A1 | * 8/2017 | ............. B62B 3/008 |

(Continued)

OTHER PUBLICATIONS

Metro Case Carts_Brochure_L04-067; Rev. Sep. 2019.

(Continued)

*Primary Examiner* — James A Shriver, II
*Assistant Examiner* — Ian Bryce Shelton
(74) *Attorney, Agent, or Firm* — Harness, Dickey & Pierce, P.L.C.

(57) ABSTRACT

An enclosed medical case cart includes a left-side panel, a back panel, and a right-side panel supported on a chassis. A top panel is supported on the left and right-side panels and the back panel. A door including a transparent panel is coupled to either the left or right-side panel by a hinge. A plurality of freely-swiveling caster wheels are coupled to the chassis. A first status indicator assembly including a plurality of flags movable between a first position and a second position is coupled to the top panel. A second status indicatory assembly having an indicator disc movable between a first position and a second position is coupled to an interior surface of the door. A fifth-wheel assembly having a non-swiveling wheel movable between a first position and a second position is coupled to the chassis.

20 Claims, 24 Drawing Sheets

(58) Field of Classification Search
CPC ..... G09F 7/22; G09F 7/10; G09F 7/04; G09F 3/185; G09F 17/00; G09F 2017/0075
See application file for complete search history.

(56) References Cited

U.S. PATENT DOCUMENTS

| | | | | |
|---|---|---|---|---|
| 4,790,610 | A * | 12/1988 | Welch | A61B 50/10 |
| | | | | D24/185 |
| D303,098 | S * | 8/1989 | Nester | D10/102 |
| D304,075 | S | 10/1989 | Welch | |
| 4,875,696 | A * | 10/1989 | Welch | B62B 5/04 |
| | | | | 188/19 |
| D323,051 | S | 1/1992 | Baggott | |
| D323,915 | S | 2/1992 | Welch | |
| D362,101 | S * | 9/1995 | Maddux | D6/675 |
| 6,014,942 | A * | 1/2000 | Perka | G09F 17/00 |
| | | | | 116/319 |
| D425,279 | S | 5/2000 | Houry et al. | |
| D440,369 | S | 4/2001 | LaFollette, Jr. et al. | |
| 6,584,927 | B1 * | 7/2003 | Iversen | G09F 17/00 |
| | | | | 116/29 |
| D489,858 | S | 5/2004 | Hay et al. | |
| D509,939 | S | 9/2005 | Hay et al. | |
| D547,920 | S | 7/2007 | Kinsley et al. | |
| D556,416 | S | 11/2007 | Zorzo | |
| D559,496 | S | 1/2008 | Zorzo | |
| D671,703 | S | 11/2012 | Guasta et al. | |
| 8,695,996 | B2 | 4/2014 | Janick et al. | |
| D707,912 | S * | 6/2014 | Koehler | D34/19 |
| 8,864,149 | B2 * | 10/2014 | Stryker | B62B 3/005 |
| | | | | 280/47.35 |
| D723,237 | S | 2/2015 | Maddux et al. | |
| D730,661 | S | 6/2015 | Brunner | |
| 9,119,522 | B1 * | 9/2015 | Barksdale | A47L 15/4293 |
| 9,472,130 | B2 * | 10/2016 | Sharpe | G09F 15/005 |
| 10,643,505 | B1 * | 5/2020 | Lorenzo | G09F 7/00 |
| 11,091,182 | B1 * | 8/2021 | Lwali | B62B 13/18 |
| 11,104,364 | B1 * | 8/2021 | Kinzler | B61D 45/007 |
| 11,332,176 | B1 * | 5/2022 | Lin | B62B 3/004 |
| 11,488,503 | B1 * | 11/2022 | Dumka | G07C 5/006 |
| 2007/0039542 | A1 * | 2/2007 | Schrauwen | G09F 11/30 |
| | | | | 116/313 |
| 2011/0089653 | A1 * | 4/2011 | Russell | B62B 3/1492 |
| | | | | 280/47.34 |
| 2011/0309591 | A1 | 12/2011 | Petrick et al. | |
| 2012/0007323 | A1 * | 1/2012 | Janick | B62B 3/008 |
| | | | | 280/79.11 |
| 2015/0059639 | A1 * | 3/2015 | Sharpe | G09F 17/00 |
| | | | | 116/173 |
| 2015/0107627 | A1 * | 4/2015 | Snyder | A47B 81/00 |
| | | | | 312/229 |
| 2015/0284018 | A1 * | 10/2015 | Krosney | A61L 2/07 |
| | | | | 55/385.2 |
| 2015/0314026 | A1 * | 11/2015 | Mauzerall | A61L 2/00 |
| | | | | 96/417 |
| 2016/0332650 | A1 * | 11/2016 | Davison, Jr. | B62B 3/003 |
| 2017/0340105 | A1 * | 11/2017 | Knighton | B62B 3/005 |
| 2018/0104015 | A1 * | 4/2018 | Bryant | A61B 50/13 |
| 2019/0263436 | A1 * | 8/2019 | Bohlman | B62B 1/12 |
| 2019/0276062 | A1 * | 9/2019 | Jackson | B62B 3/02 |
| 2020/0015586 | A1 * | 1/2020 | Romantic | A47F 5/0031 |
| 2021/0387821 | A1 * | 12/2021 | Kinzler | B62B 5/04 |
| 2022/0093011 | A1 * | 3/2022 | Huntington | G09F 3/20 |
| 2022/0307753 | A1 | 9/2022 | He et al. | |
| 2023/0114863 | A1 * | 4/2023 | Soodi et al. | A47B 31/02 |
| | | | | 280/47.34 |
| 2023/0143591 | A1 * | 5/2023 | Soodi et al. | B62B 3/004 |
| | | | | 280/47.34 |

FOREIGN PATENT DOCUMENTS

| | | | | |
|---|---|---|---|---|
| GB | 2423500 A * | 8/2006 | ........... | A61G 1/0225 |
| WO | WO-2008023685 A1 * | 2/2008 | ......... | B60B 33/0039 |

OTHER PUBLICATIONS

Metro case, announced 2023 [online], [site visited Feb. 1, 2023]. Avail from int, URL: https://metro.com/shop/ metro-casevue-surgical-case-carts-with-clear-doors-45-5w-x-28d-x-40-625h/ (Year: 2023).
Pedigo, announced 2023 [online], [site visited Feb. 1, 2023]. Avail from int, URL: https://www.universalmedicalinc.com/ pedigo-revolution-closed-su rg ical-case-cart-with-dou ble-door -46-25-w-x-27 -5-d-x-59-h. html (Year: 2023).

* cited by examiner

CLOSED CASE CART

CROSS-REFERENCE TO RELATED APPLICATIONS

This application claims the benefit and priority of Indian Patent Application No. 202121005707, filed Feb. 10, 2021. The entire disclosure of the above application is incorporated herein by reference.

FIELD

The present disclosure relates generally to enclosed case carts used to transport stored items between locations, and more particularly, but without limitation, to medical carts that are highly-maneuverable and stable during transport, easily sanitized and include user-selected, secure and/or tamper-resistant status indicators from which the configuration and/or condition of the cart can be readily determined.

BACKGROUND

This section provides background information related to the present disclosure which is not necessarily prior art.

Enclosed case carts are employed in situations where items are loaded in one location (e.g., a central inventory repository) and transported to another location (e.g., a work location) for use.

Enclosed case carts are used in hospital settings, such as, e.g., a closed surgical case cart used to transport sterile instruments/items between a supply storage location and a surgical arena. Surgical case carts are used for transporting sterile supplies and devices from a supply room to an operating room, and to transport the soiled equipment from the operating room to a location dedicated to the handling and processing (e.g., for sanitation, disposal and/or re-sterilization) of the used equipment at the conclusion of the surgery. Enclosed surgical case carts are particularly useful when a non-dedicated corridor is used for transport between sterile instrument and supply storage and the surgical arena. The enclosure protects sterile instruments and supplies from the environment on the way to the operating room and protects the environment from the soiled instruments on the return trip from the surgical arena to a decontamination area where the instruments, supplies and the cart are cleaned, sanitized, and/or re-sterilized.

However, chaotic hospital environments present many unique challenges to conventional enclosed case carts. Given the time-critical nature of many emergency medical procedures, enclosed case carts often need to be moved through narrow and crowded hospital corridors and rooms at high-speeds. Thus, there is a long-felt need for enclosed case carts that are both easily and rapidly maneuverable around tight corners but nevertheless possess good straight-line stability, particularly at high speeds. Furthermore, there exists a long-felt need for enclosed case carts having integrated protection from bumps and collision that does not add to the overall bulk of the cart. Additionally, there is also a long-felt need for enclosed case carts that allow medical professionals to quickly and accurately identify how cart are configured and which carts contain sanitized and/or ready-to-use supplies, instruments, and/or equipment, and for the cart, including the status indicators, to be easily sanitized and/or be tamper resistant.

SUMMARY

This section provides a general summary of the disclosure, and is not a comprehensive disclosure of its full scope or all of its features.

According to the present disclosure, an enclosed medical case cart is provided. The enclosed medical case cart includes a left-side panel, a back panel, and a right-side panel supported on a chassis. A top panel is supported on the left-side panel, the back panel, and the right-side panel opposite the chassis. A door is coupled to either the left-side panel or the right-side panel by a hinge, and the door may include a transparent panel. A plurality of freely-swiveling caster wheels is coupled to the chassis. A first status indicator assembly is coupled to the top panel, and includes a plurality of flags. Each flag is movable between a first position and a second position. The flag protrudes above the top panel in the first position and does not protrude above the top panel in the second position.

A second status indicator assembly is coupled to a surface of the door. The second status indicator assembly includes an indicator disc. The indicator disc is movable between a first position and a second position to indicate a first status in the first position and a second status in the second position.

In other features, each flag of the plurality of flags is pivotable between the first position and the second position relative to a mounting bracket of the first status indicator assembly. Each flag of the plurality of flags may include a magnet, and each flag of the plurality of flags may be magnetically coupled to the mounting bracket in at least one of the first position and the second position.

In other features, each flag of the plurality of flags includes a first aperture formed through a mounting portion of the flag. The first status indicator assembly includes a mounting bracket having a base, a vertical flange, and a wall offset from the base. A rod is received through a second aperture formed in the flange of the mounting bracket and the first aperture formed through the mounting portion of the flag. Each flag of the plurality of flags may be pivotable about the rod between the first position and the second position.

In other features, each flag includes a recess proximate the mounting portion and a magnet disposed in the recess and sealed from the outside environment. In other features, a portion of the flag is in contact with the wall in the first position and is in contact with the base in the second position. In other features, the magnet couples the flag to the wall in the first position and couples the flag to the base in the second position.

In other features, each flag may be coupled to the mounting bracket by a friction hinge. The friction hinge may be configured to retain the flag in the first position or the second position.

In other features, the second status indicator includes a cover plate disposed over the indicator disc. The indicator disc is positioned between the cover plate and the door. In other features, the cover plate may include a first vertical extension and a second vertical extension, and the indicator disc may include a tab. In other features, the tab may be in contact with the first vertical extension when the indicator disc is in the first position, and the tab may be in contact with the second vertical extension when the indicator disc is in the second position.

In other features, the indicator disc includes a first side opposite a second side. A portion of a first half of the first side of the indicator disc is visible below an edge of the cover plate and a portion of a first half of the second side of the indicator disc is visible through the transparent panel when the indicator disc is in the first position. A portion of a second half of the first side of the indicator disc is visible below the edge of the cover plate and a portion of a second half of the second side of the indicator disc is visible through the transparent panel when the indicator disc is in the second position.

In other features, the cover plate occludes the second half of the first side of the indicator disc and an edge of the door occludes the second half of the second side of the indicator disc when the indicator disc is in the first position. The cover plate occludes the first half of the first side of the indicator disc and the edge of the door occludes the first half of the second side of the indicator disc when the indicator disc is in the second position.

In still other features, a fifth-wheel assembly is coupled to the wheeled chassis. The fifth-wheel assembly includes a non-swiveling wheel and a foot pedal coupled to the non-swiveling wheel. The foot pedal is movable between a first position and a second position, with the non-swiveling wheel being raised in the first position and lowered in the second position to be in contact with a ground.

In other features, a recessed portion may be formed on the right-side panel by a plurality of walls. A swing-up handle may be pivotally coupled to the plurality of walls, and an end of the swing-up handle may be configured to rotate out of the recessed portion.

An enclosed cart including a left-side panel, a back panel, and a right-side panel supported on a wheeled chassis is also provided. A top panel is supported on the left-side panel, the back panel, and the right-side panel to define a cabinet. A left-hand door is hingedly coupled to the left-side panel, and a right-hand door is hingedly coupled to the right-side panel. The right-hand door includes a transparent panel. A plurality of caster wheels are coupled to the wheeled chassis.

A first status indicator assembly is coupled to the top panel, and includes a bracket having a base, a flange, and a wall offset from the main portion. A flag having a first end opposite a second end is pivotally coupled to the flange at the second end. A magnet is coupled to the flag at the second end. The flag pivots between a first position and a second position. The first end is positioned below the top panel in the first position and raised above the top panel in the second position. The magnet couples the flag to the base in the first position, and the magnet couples the flag to the wall in the second position.

A second status indicator assembly is coupled to a surface of the right-hand door, and includes an indicator disc having a first side and a second side. The indicator disc is positioned between a cover plate and the surface of the door. The mounting plate is disposed adjacent to the right-hand door. The indicator disc includes a tab. The cover plate includes a first vertical portion and a second vertical portion and occludes a top half of the first side of the indicator disc, and a portion of the bottom half of the first side of the indicator disc is visible below a lower edge of the cover plate. The mounting plate occludes a top half of the second side, and a portion of the bottom half of the second side of the indicator disc is visible through the transparent window.

In other features, fifth-wheel assembly is coupled to the wheeled chassis, and includes a non-swiveling wheel and a foot pedal coupled to the non-swiveling wheel. The foot pedal is movable between a first position and a second position to raise the wheel mechanism in the first position and lower the wheel mechanism in the second position.

An enclosed case cart including a top panel supported above a chassis by a left-side panel, right-side panel, and a back panel is also provided. A door is hingedly coupled to the right-side panel, a plurality of caster wheels are coupled to the chassis, and a fifth-wheel assembly is coupled to the chassis. The fifth-wheel assembly includes a non-swiveling wheel and a foot pedal coupled to the non-swiveling wheel. The foot pedal is configured to lower the wheel when the foot pedal is in a first position and raise the wheel when the foot pedal is in a second position.

A first status indicator assembly is coupled to the top panel, and includes a flag that is movable between a first position and a second position. The flag protrudes above the top panel in the first position, and does not protrude above the top panel in the second position. A second status indicator assembly is coupled to an exterior surface of the door. The second status indicator includes an indicator disc that is movable between a first position and a second position to indicate a status.

In other features, the second status indicator includes a cover plate disposed over the indicator disc such that the indicator disc is positioned between the cover plate and the door. In other features, a decal may be disposed on the indicator disc. The decal may face away from the exterior surface of the door. In other features, a diameter divides the decal into a first half and a second half.

In other features, the indicator disc may include a tab. The cover plate may include a first vertical portion and a second vertical portion. The tab may be in contact with the first vertical portion in the first position, and in contact with the second vertical portion in the second position. A part of the first half of the decal is visible below a bottom edge of the cover plate. The cover plate occludes the second half of the decal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The included drawing figures show the various features of the case cart of the present disclosure, including the case cart's design aesthetics, the case cart configuration/status indicator, the case cart sanitation status indicator, the 5th wheel steering assist assembly, and the integrated cart protection handles.

Figure 6:
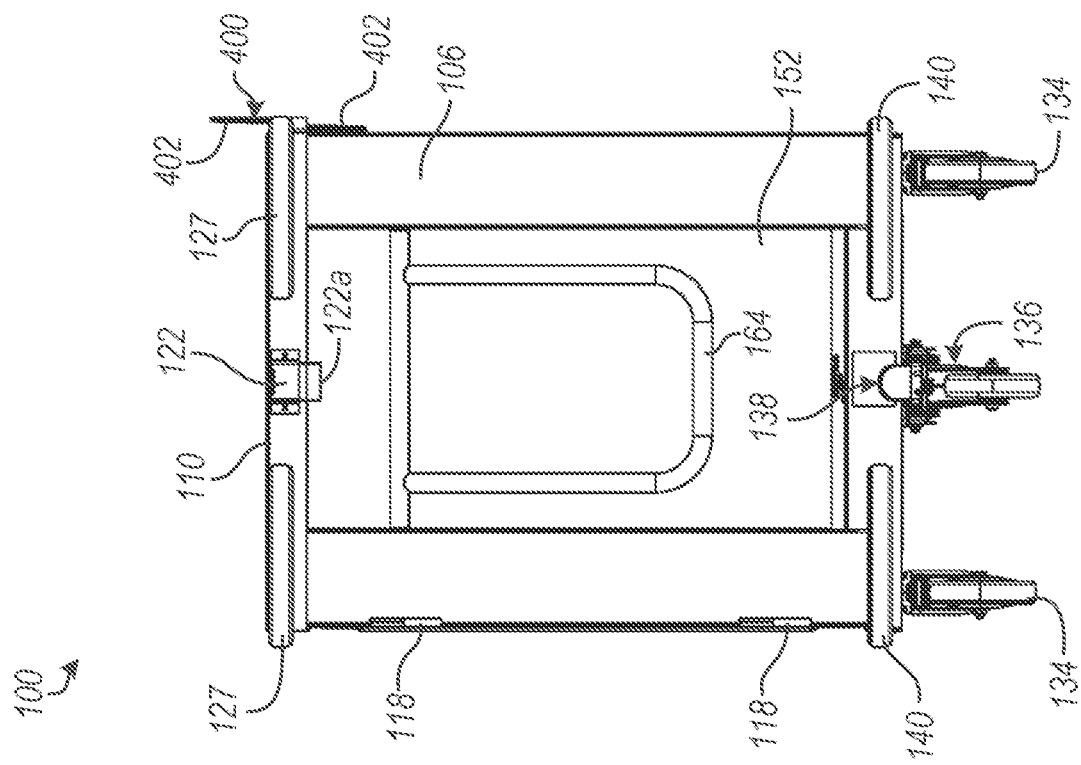
Figure 5:
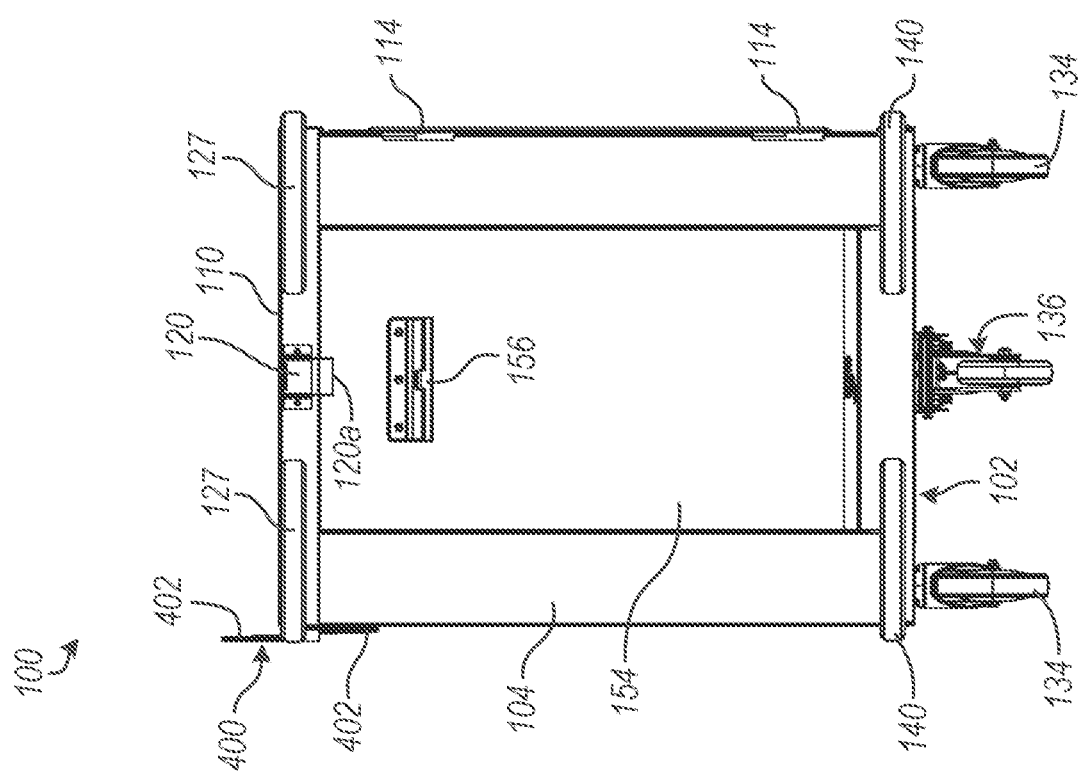
Figure 7:
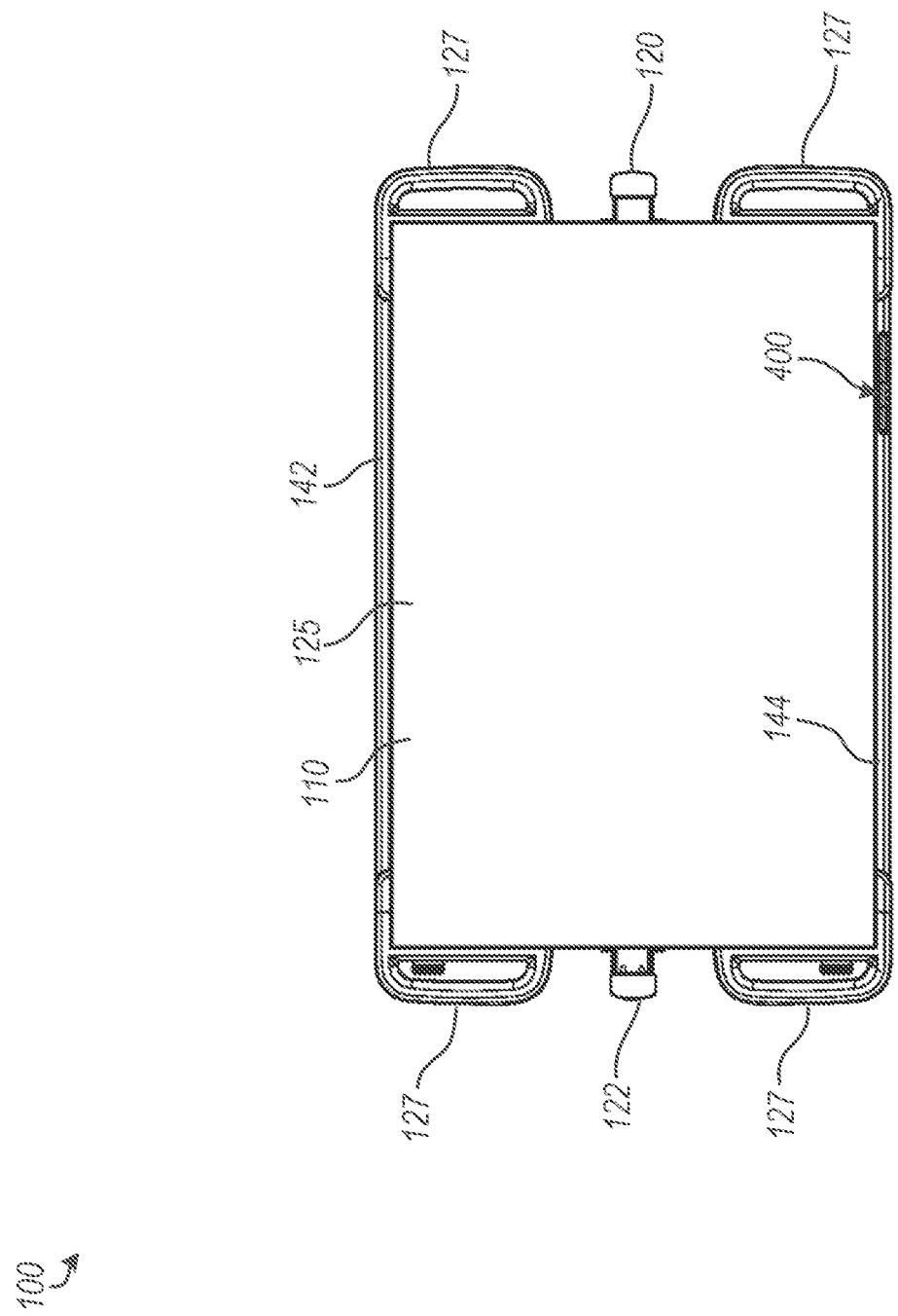
Figure 8:
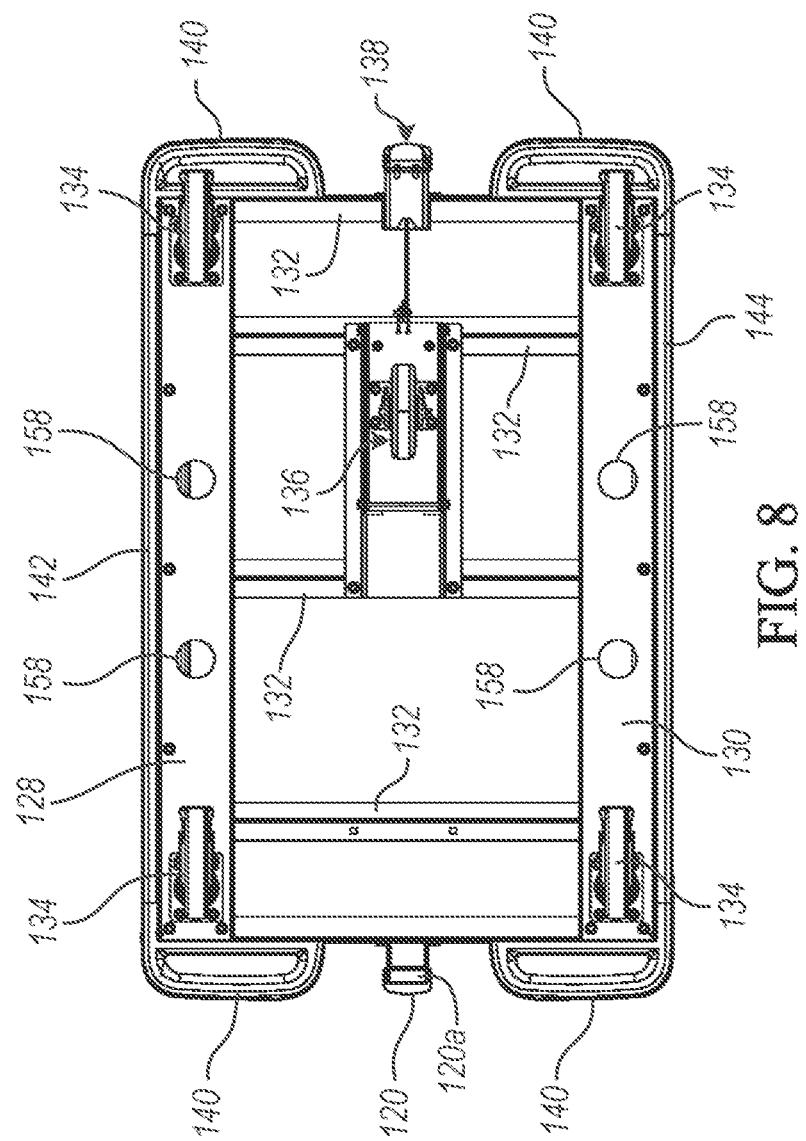
Figure 9:
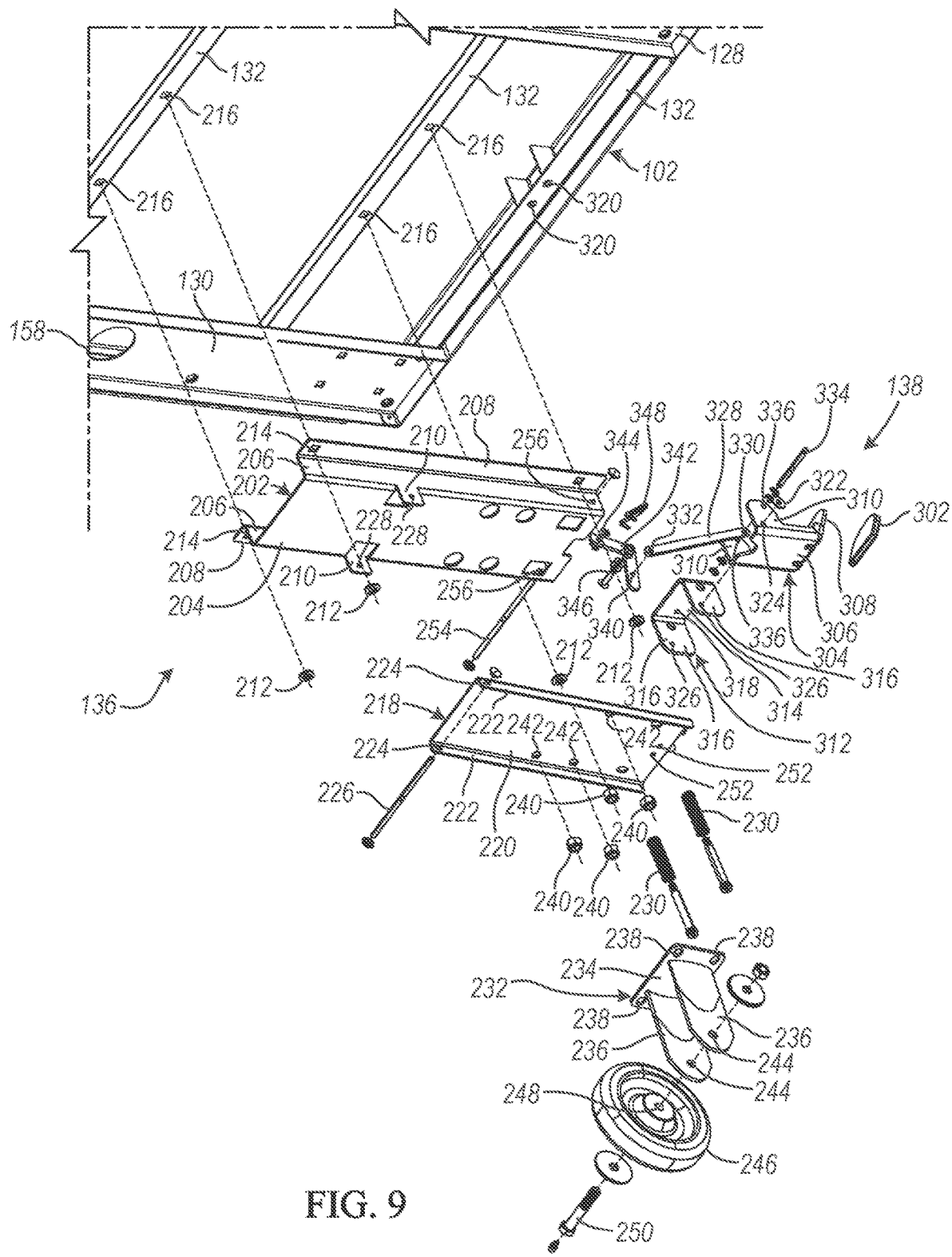
Figure 10:
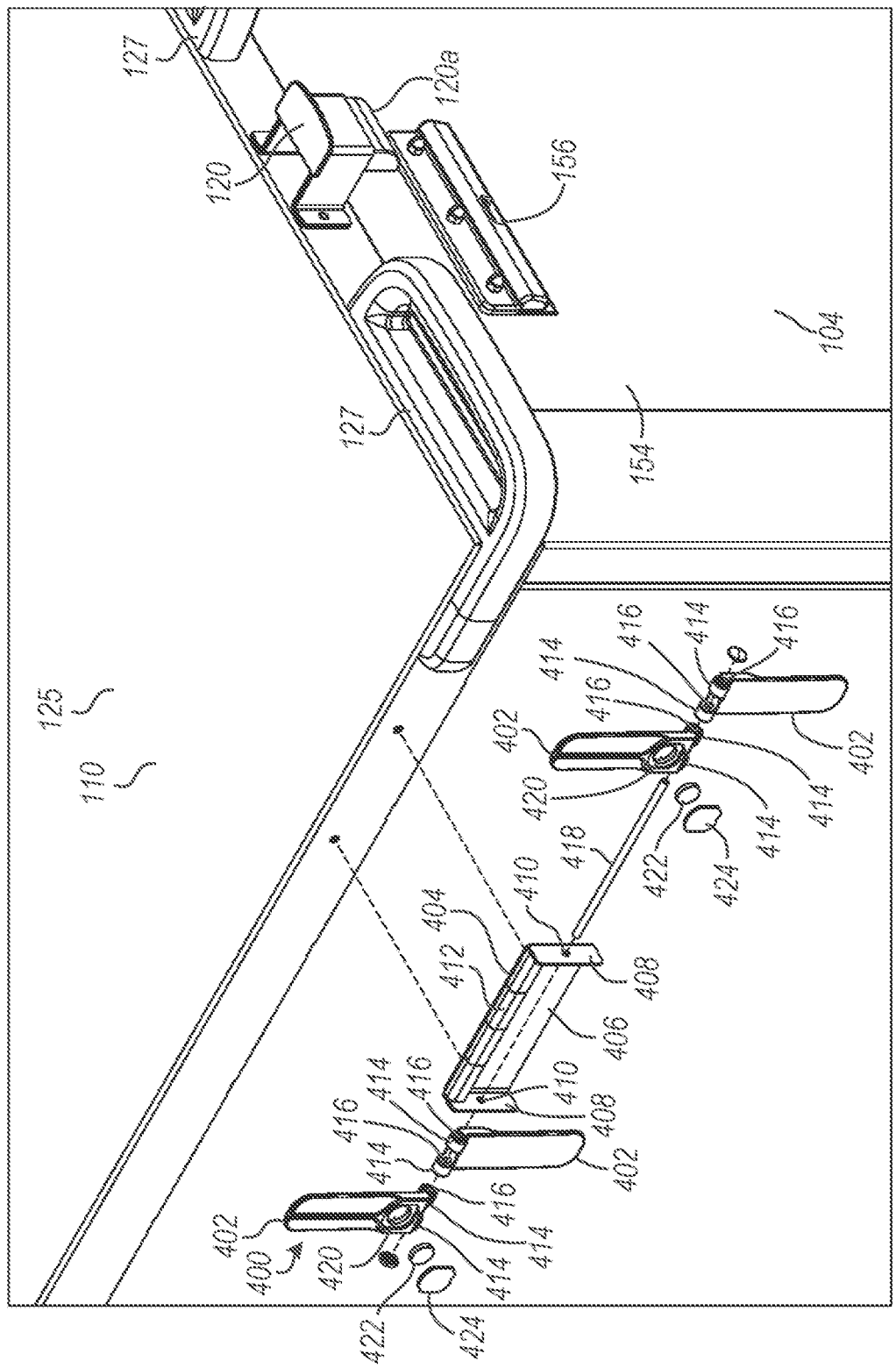
Figure 10A:
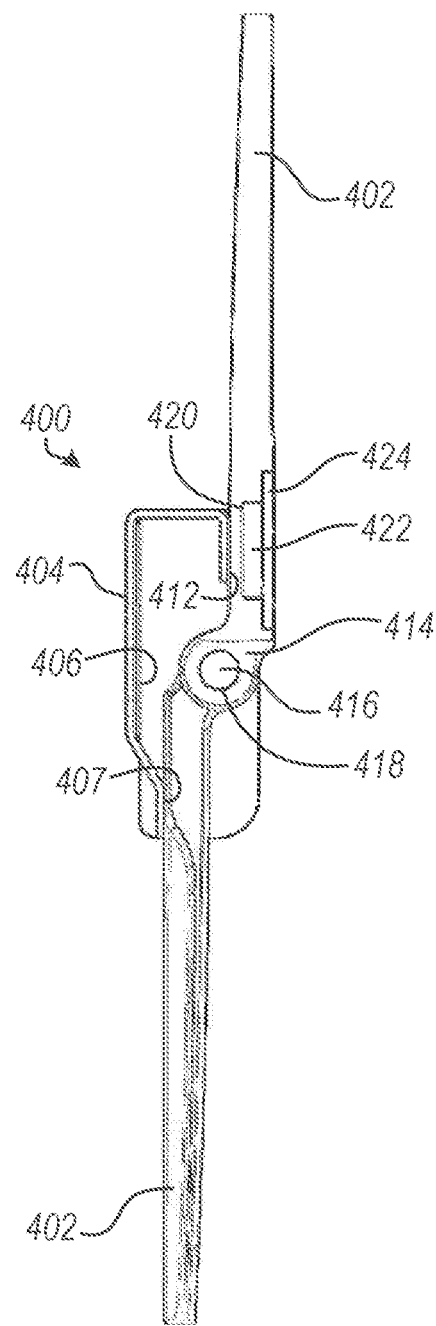
Figure 11:
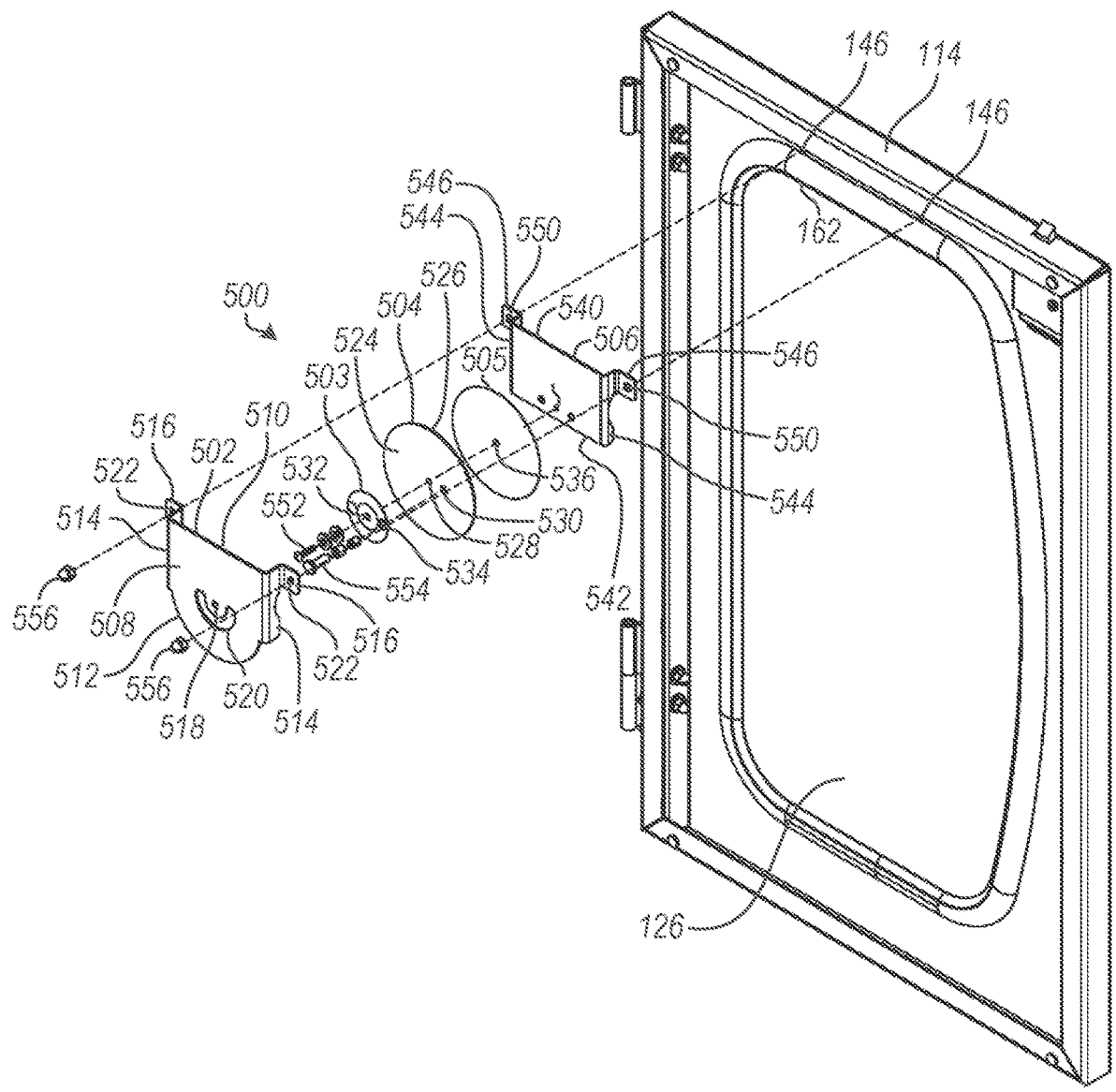
Figure 11A:
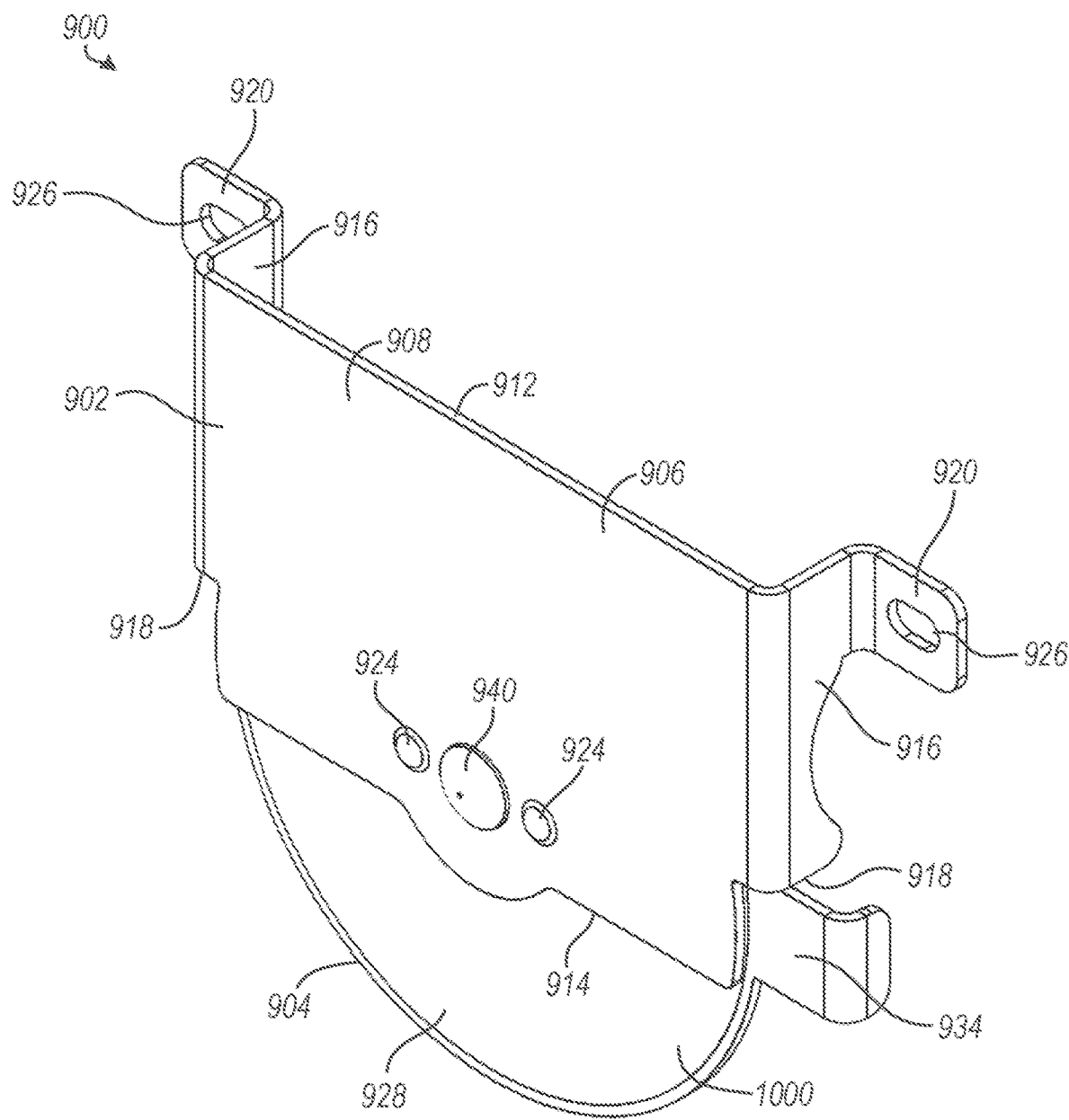
Figure 11B:
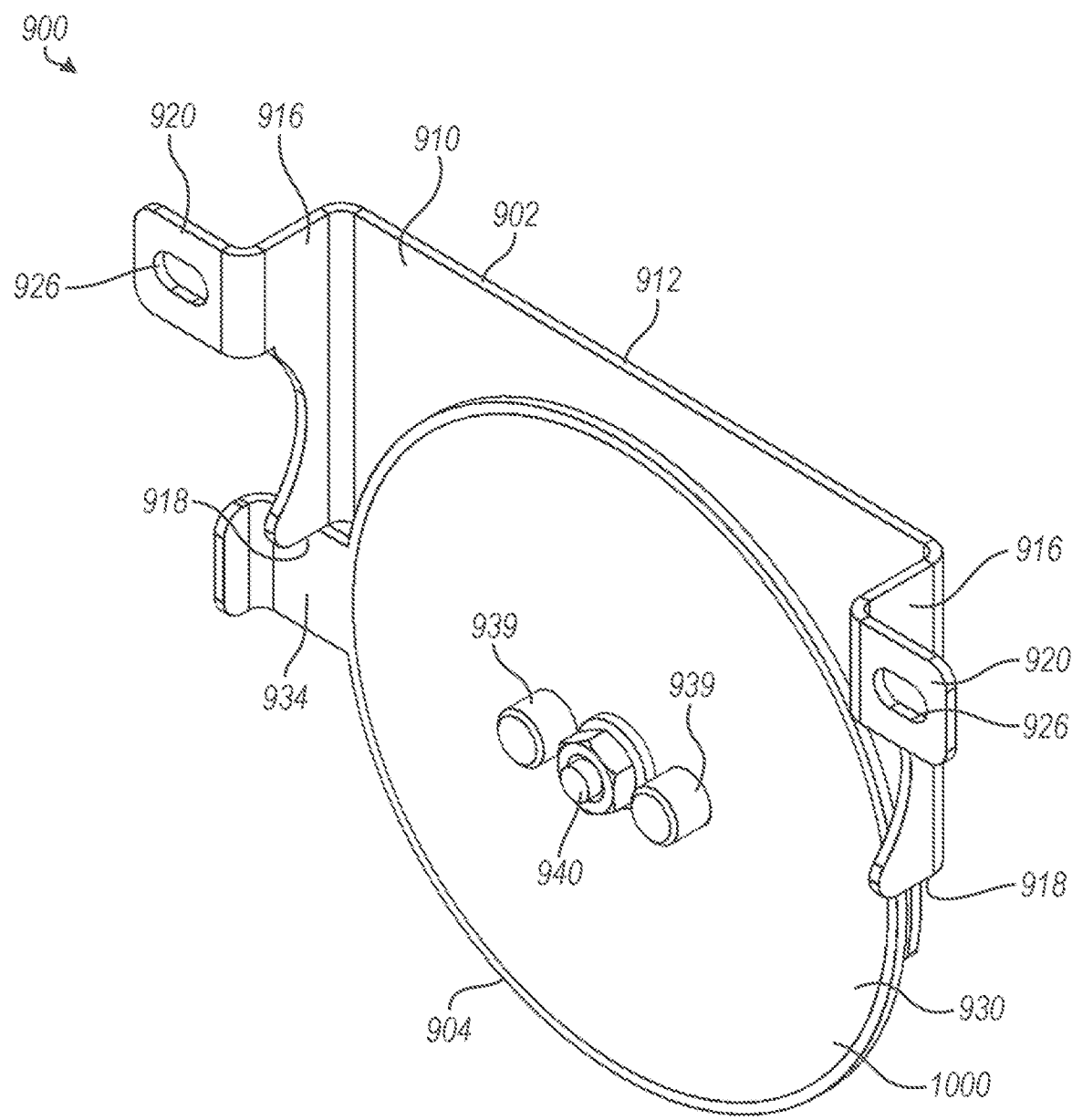
Figure 11C:
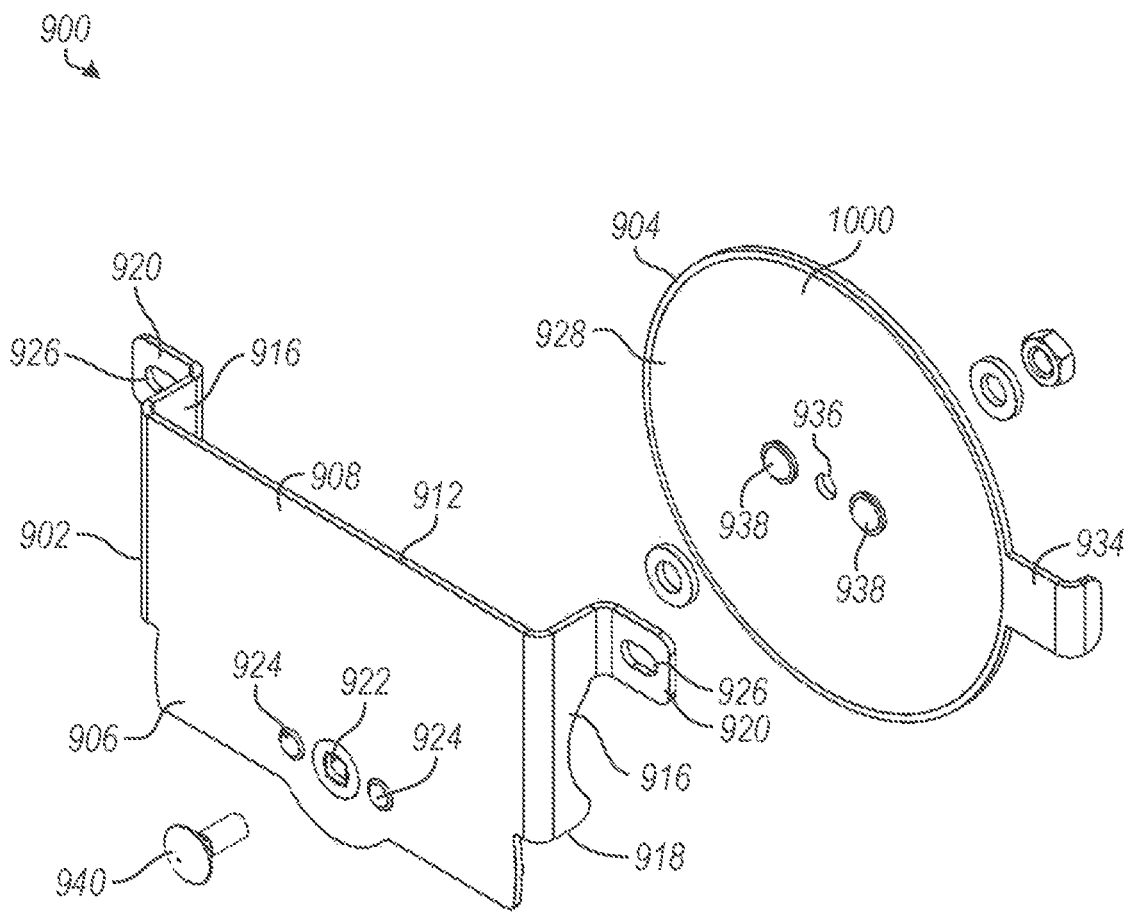
Figure 11D:
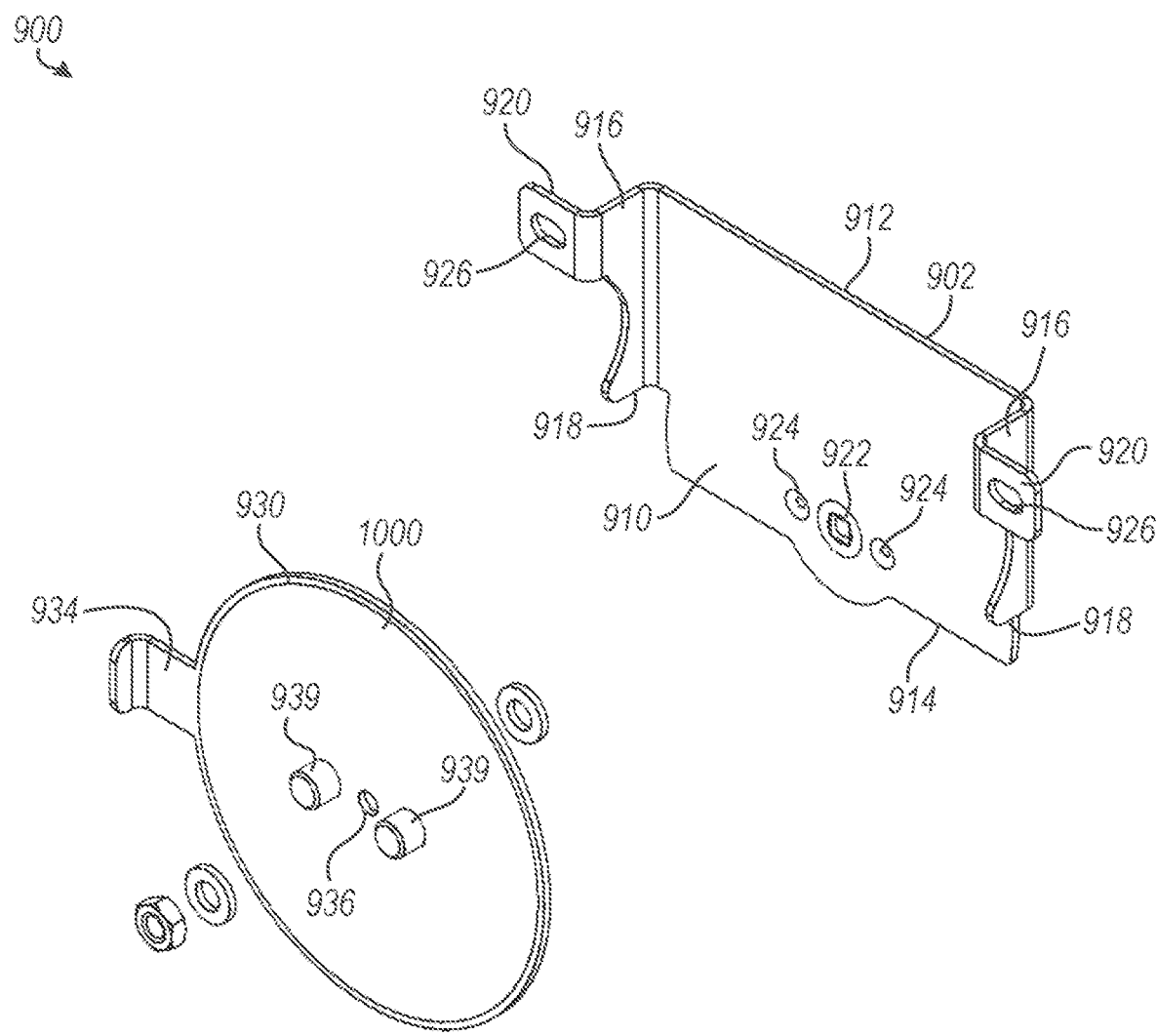
Figure 11E:
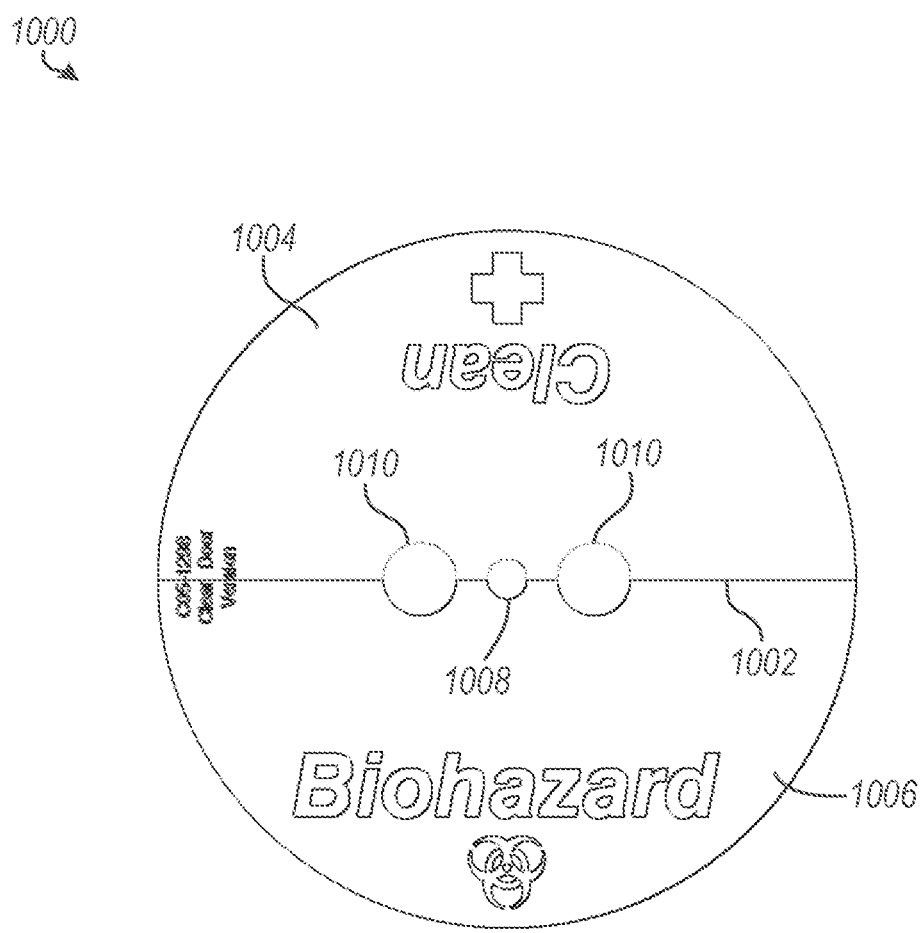
Figure 12:
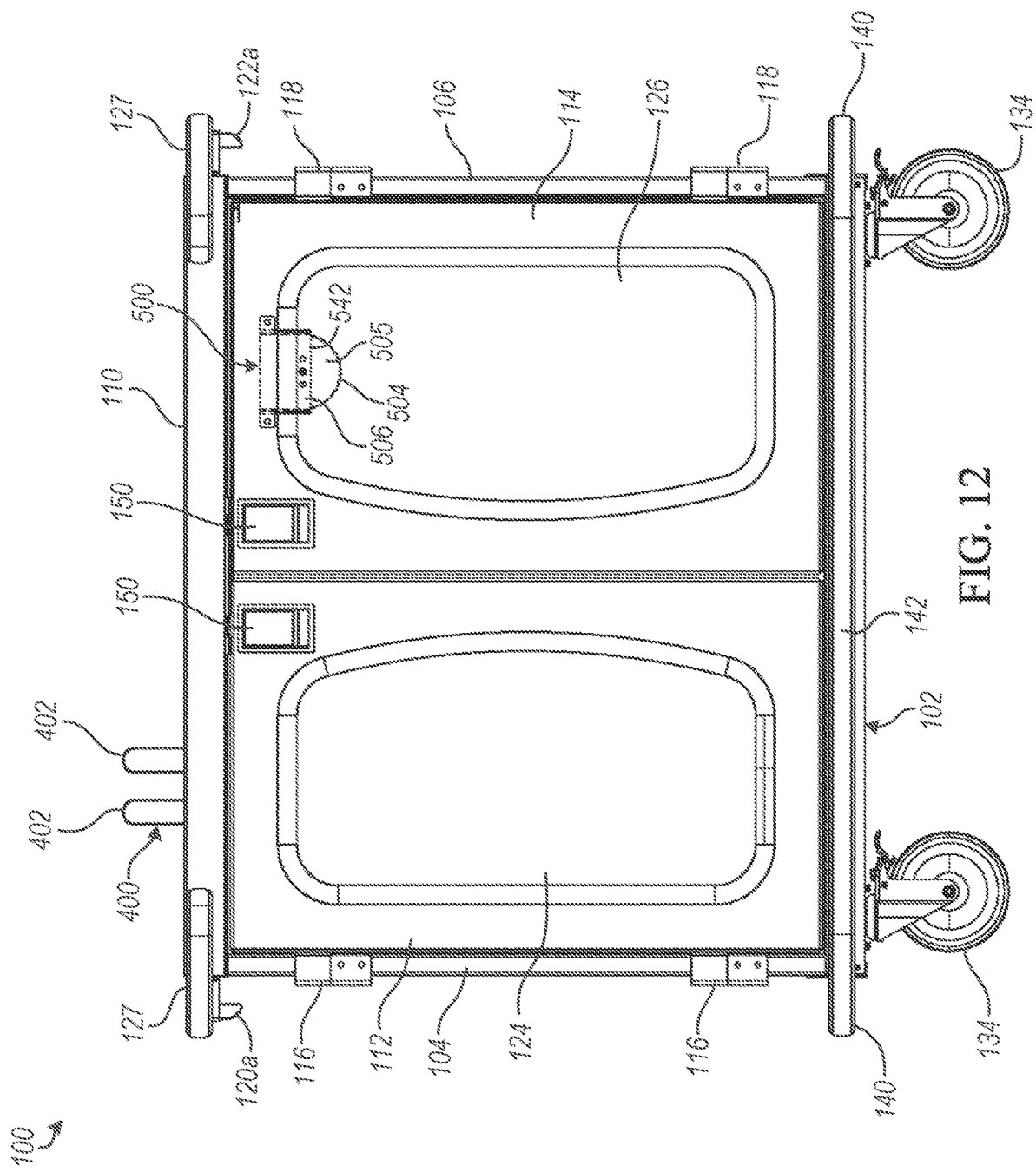
Figure 13:
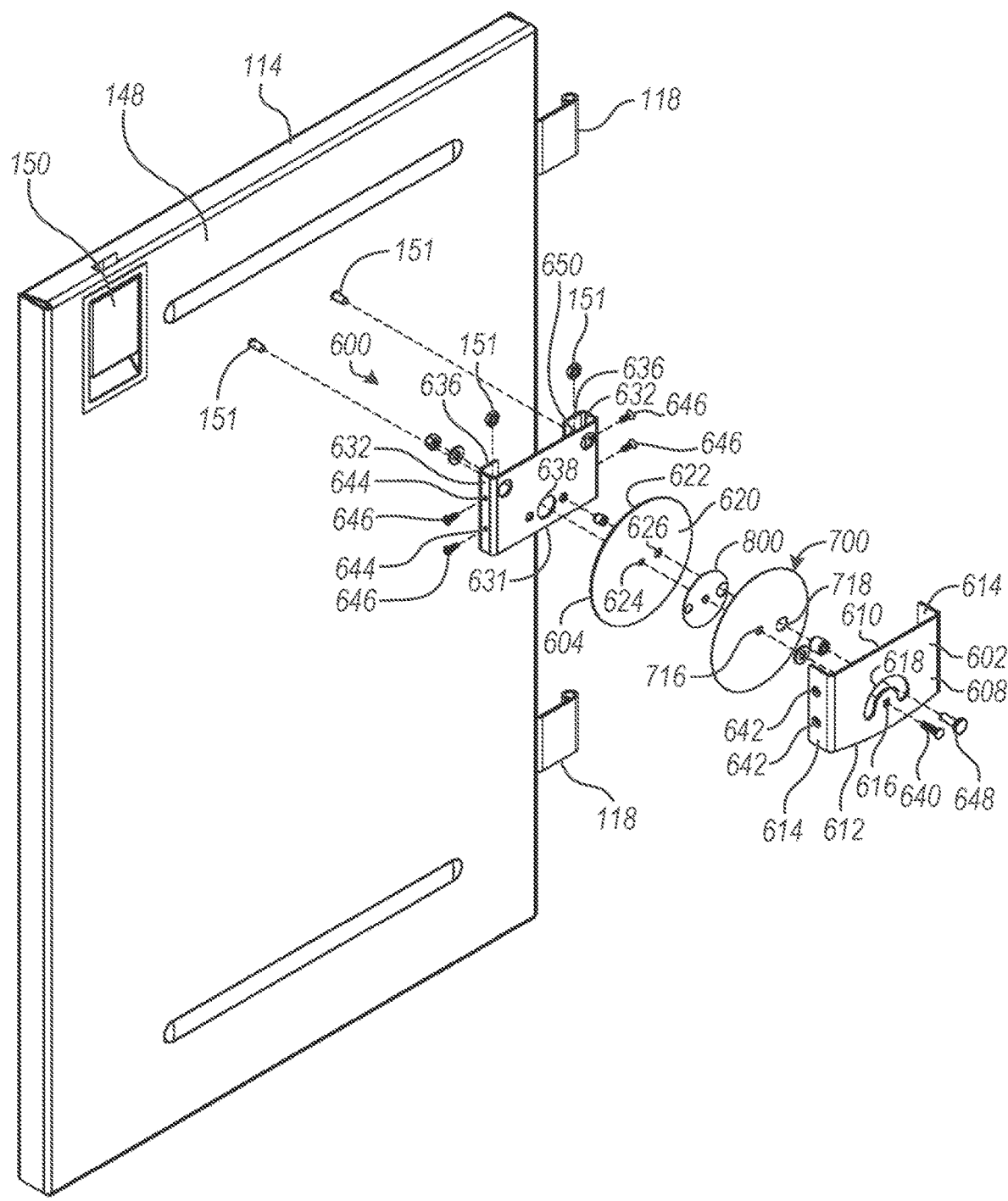
Figure 13A:
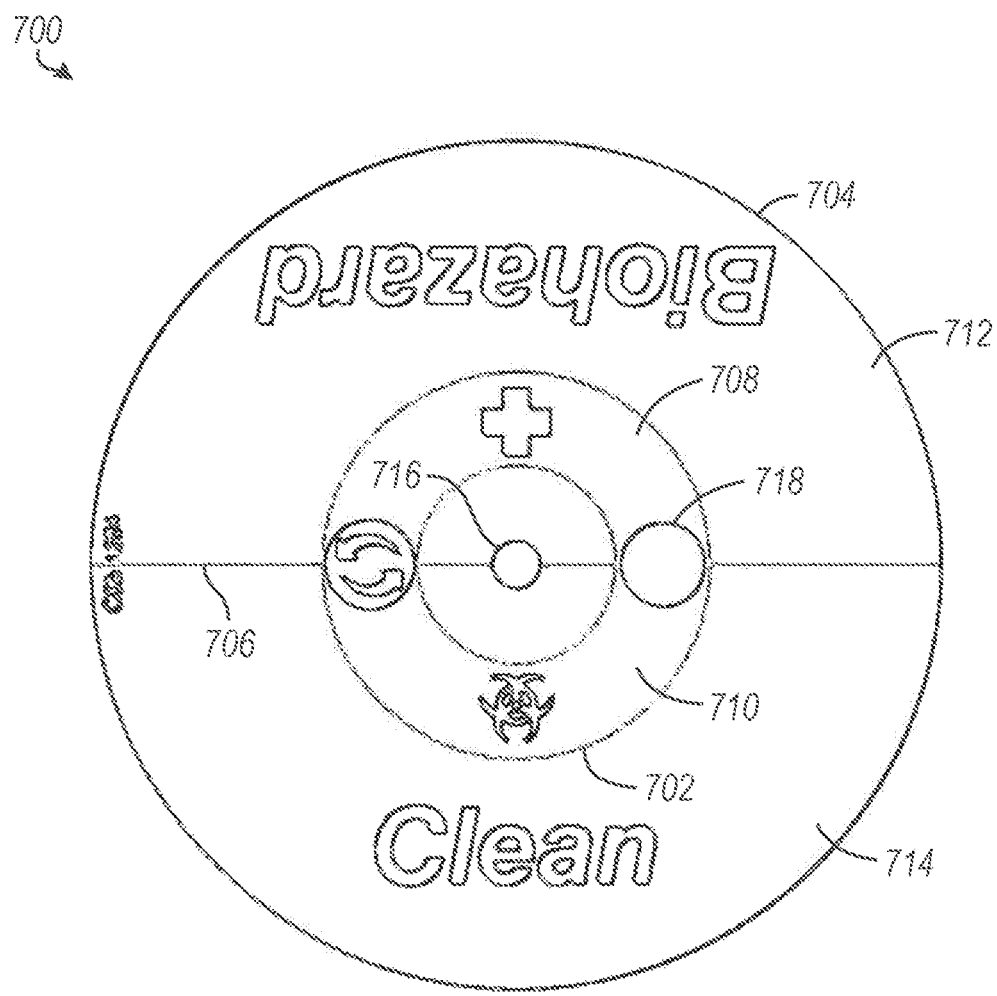
Figure 13B:
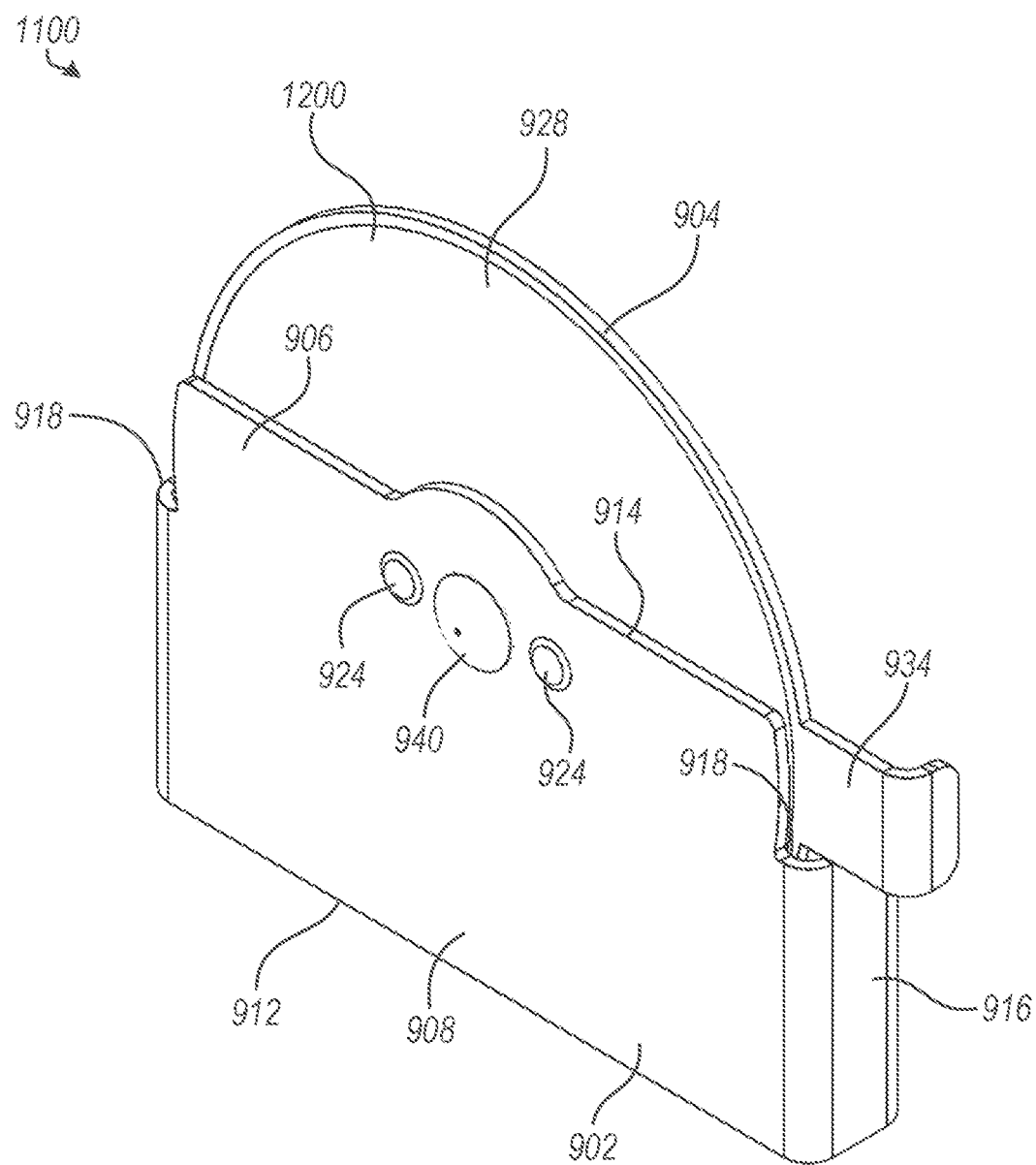
Figure 13C:
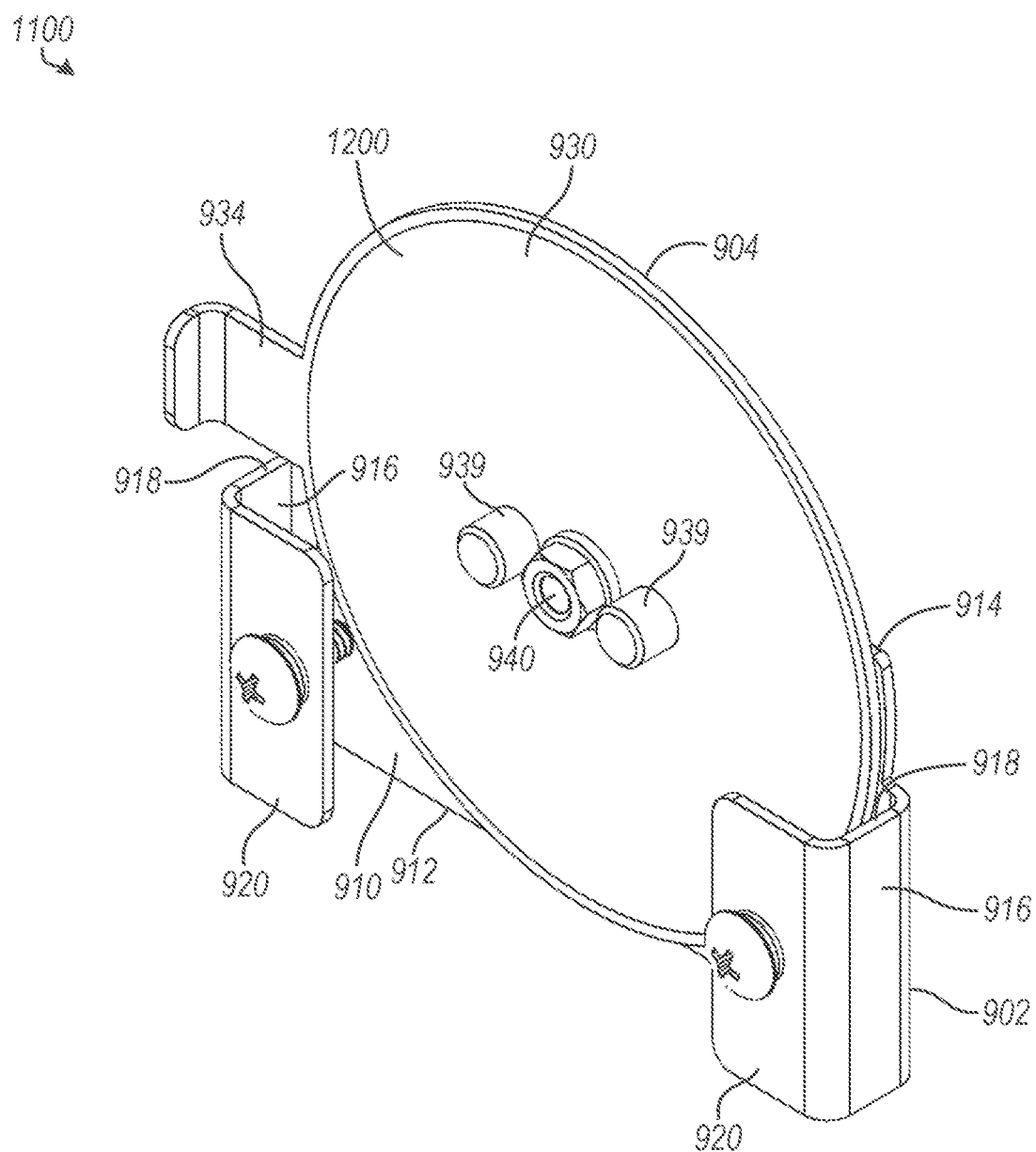
Figure 13D:
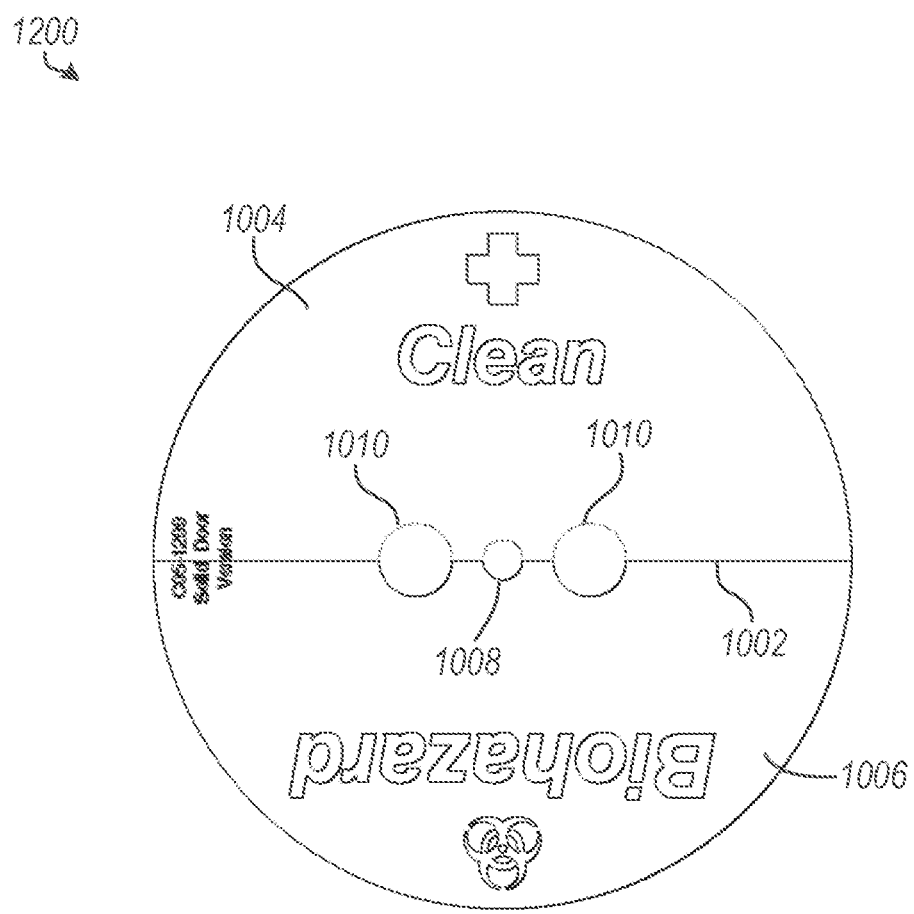
Figure 13E:
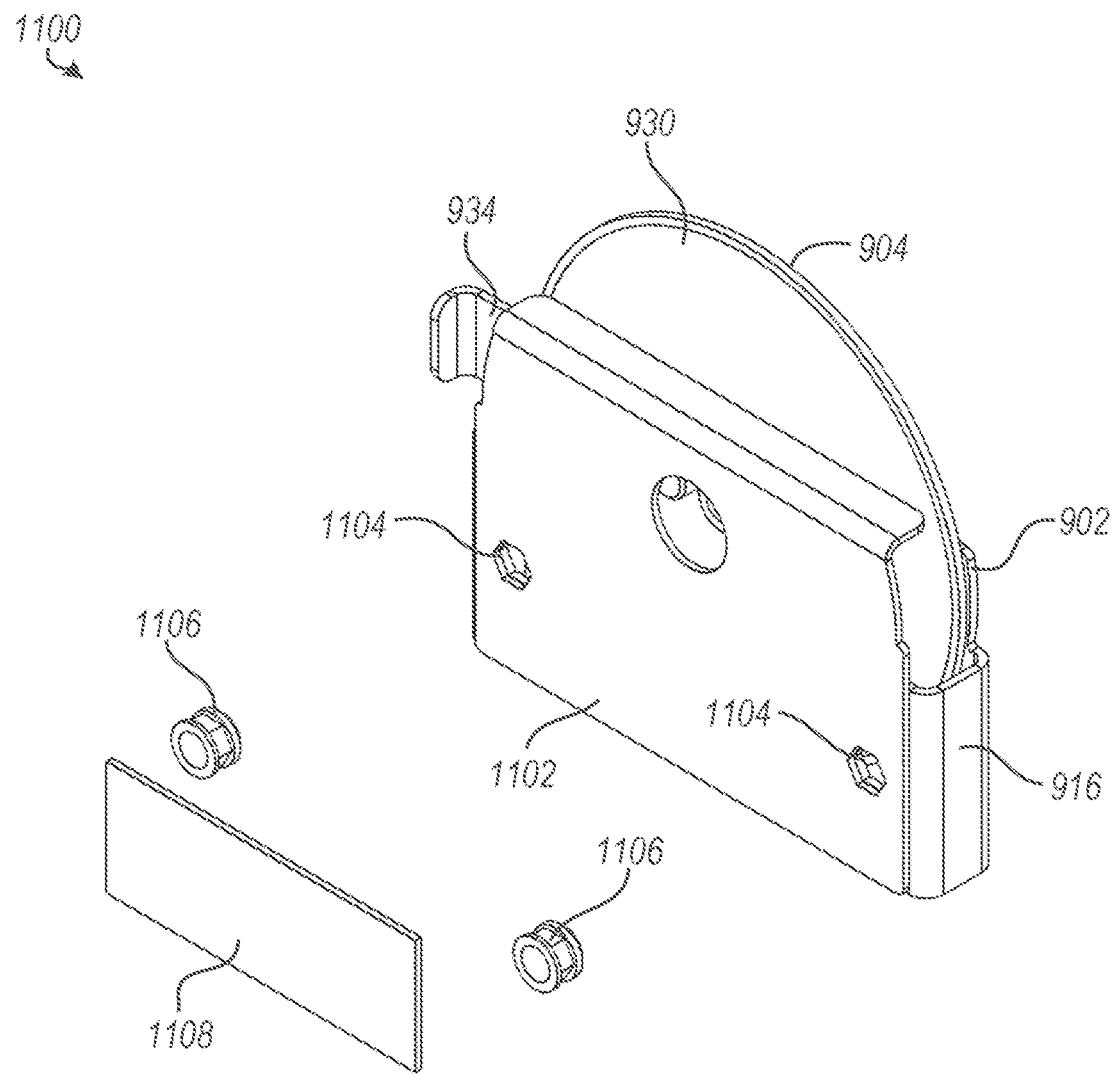
Figure 14:
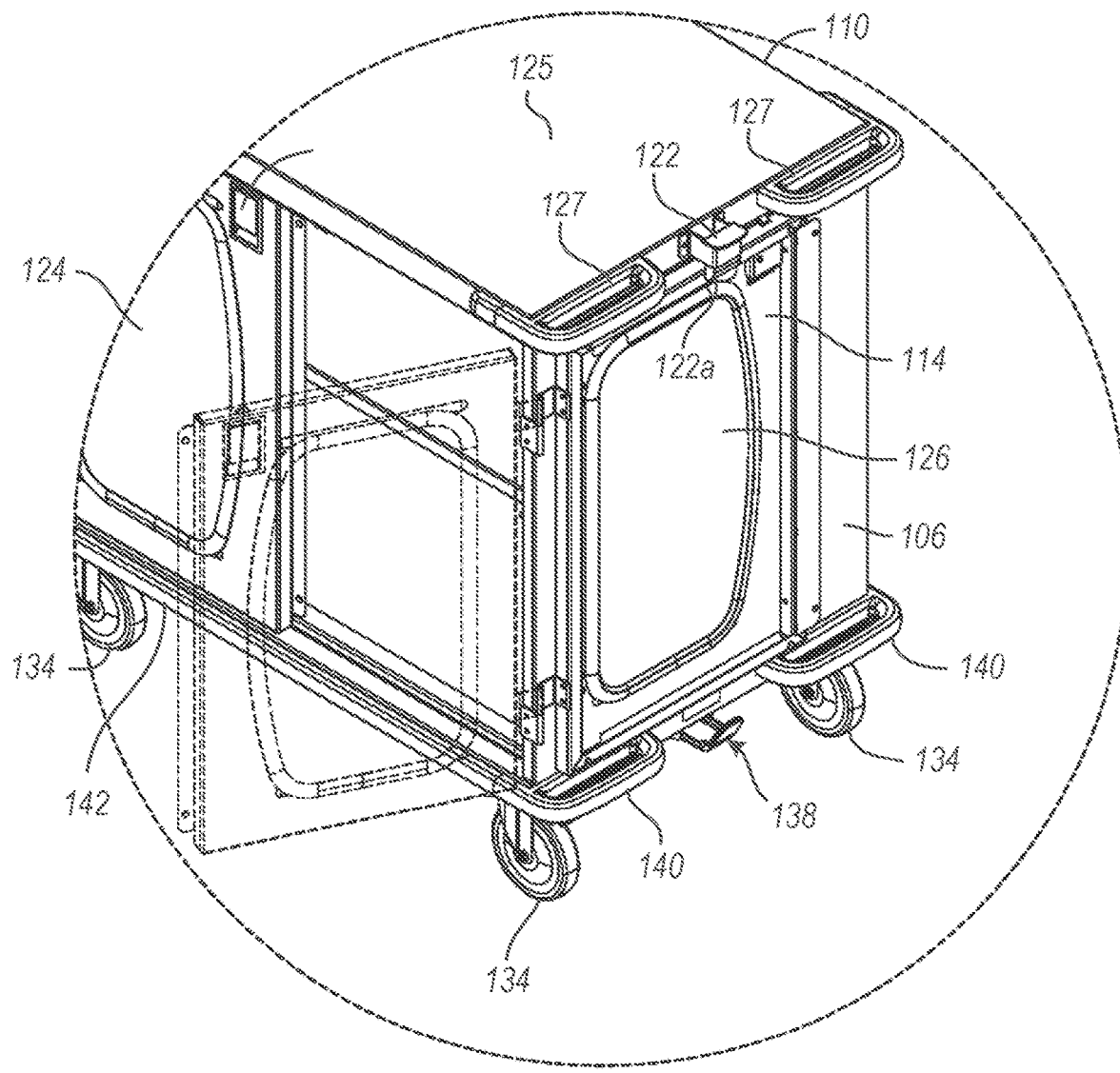

FIGS. 5 and 6, respectively, are left and right-side views of a case cart according to the present disclosure;

FIG. 7 is a top view of a case cart according to the present disclosure;

FIG. 8 is a bottom view of a case cart according to the present disclosure;

FIG. 9 is an exploded perspective detail view showing a case cart $5^{th}$ wheel steering assist assembly of the present disclosure;

FIG. 10 is an exploded perspective detail view showing a case cart configuration/status indicator of the present disclosure;

FIG. 10A is a cross-sectional side view showing a case cart configuration/status indicator of the present disclosure;

FIG. 11 is an exploded perspective detail view showing a case cart sanitation status indicator of the present disclosure;

FIG. 11A is a front-right perspective view showing an alternate case cart sanitation status indicator of the present disclosure;

FIG. 11B is a rear-left perspective view showing the alternate case cart sanitation status indicator of FIG. 11A;

FIG. 11C is a front-right exploded perspective detail view showing the alternate case cart sanitation status indicator of FIG. 11A;

FIG. 11D is a rear-left exploded perspective detail view showing the alternate case cart sanitation status indicator of FIG. 11A;

FIG. 11E is a front view of a decal used in the alternate case cart sanitation status indicator of FIG. 11A;

FIG. 12 is a front view of a case cart showing a case cart sanitation status indicator of the present disclosure;

FIG. 13 is an exploded perspective detail view showing another alternate case cart sanitation status indicator of the present disclosure;

FIG. 13A is a front view of a decal used in the alternate case cart sanitation status indicator of FIG. 13;

FIG. 13B is a front-right perspective view of still another alternate case cart sanitation status indicator of the present disclosure;

FIG. 13C is a rear-left perspective view of the alternate case cart sanitation status indicator of FIG. 13B;

FIG. 13D is a front view of a decal used in the alternate case cart sanitation status indicator of FIG. 13B;

FIG. 13E is a front-right perspective view showing additional features of yet another alternate case cart sanitation status indicator of the present disclosure; and FIG. 14 is a partial top-front perspective view of a case cart of the present disclosure showing a door in a partially opened condition and a fully opened condition.

DETAILED DESCRIPTION

Example embodiments will now be described more fully with reference to the accompanying drawings.

Referring now to the figures, the closed case cart of the present disclosure is shown and described. The case cart provides a mobile enclosed carrier or container for the transport of items stored inside and provides an aesthetically pleasing and distinctive configuration. Additionally, the case cart of the present disclosure includes a case cart supply configuration and status indicator, a case cart sanitation status indicator, a fifth (5th) wheel steering assist assembly, and/or integrated cart protection handles.

Figure 1:
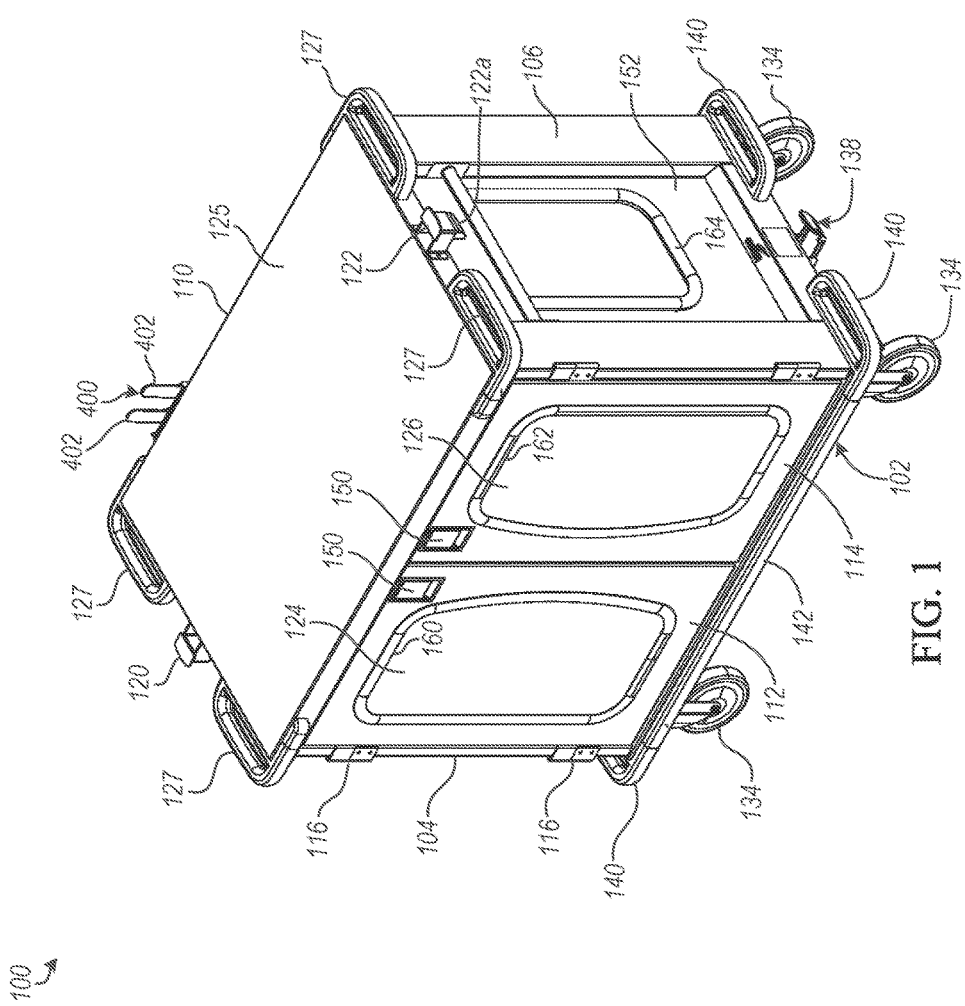
FIG. 1 is a top-front perspective view of a case cart according to the present disclosure.
Figure 2:
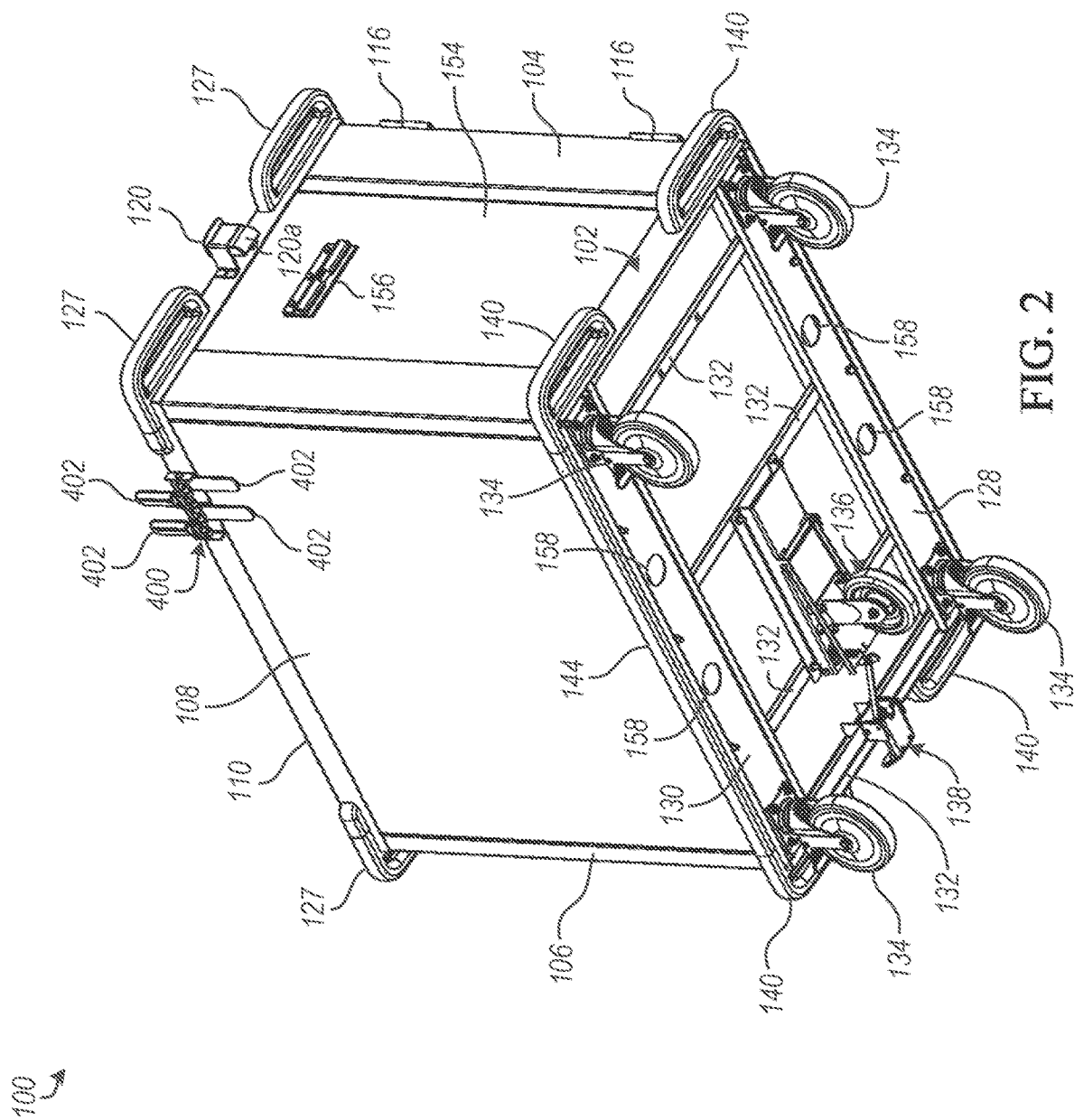
FIG. 2 is a bottom-rear perspective view of a case cart according to the present disclosure.
Figure 3:
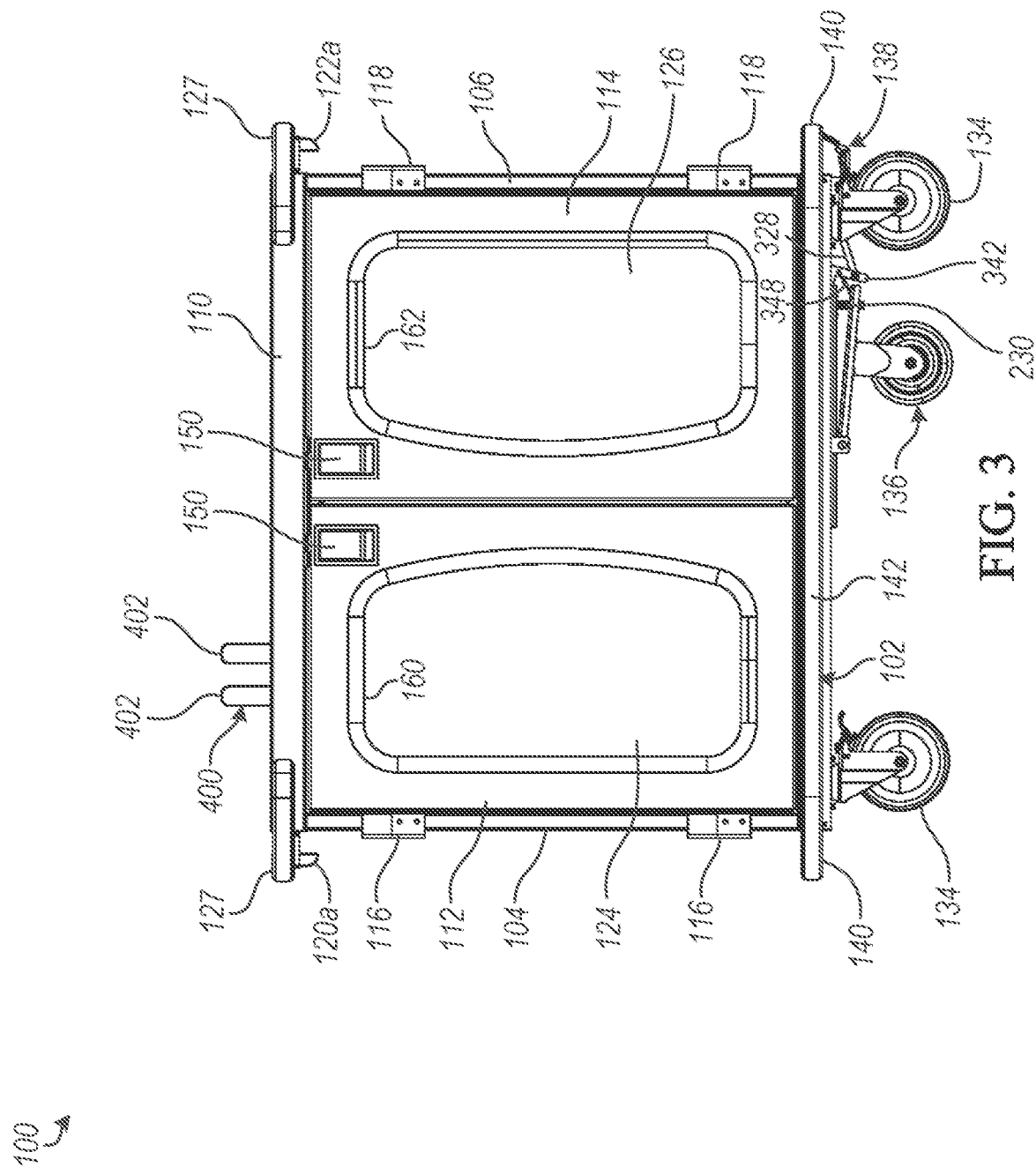
FIG. 3 is a front view of a case cart according to the present disclosure.
Figure 4:
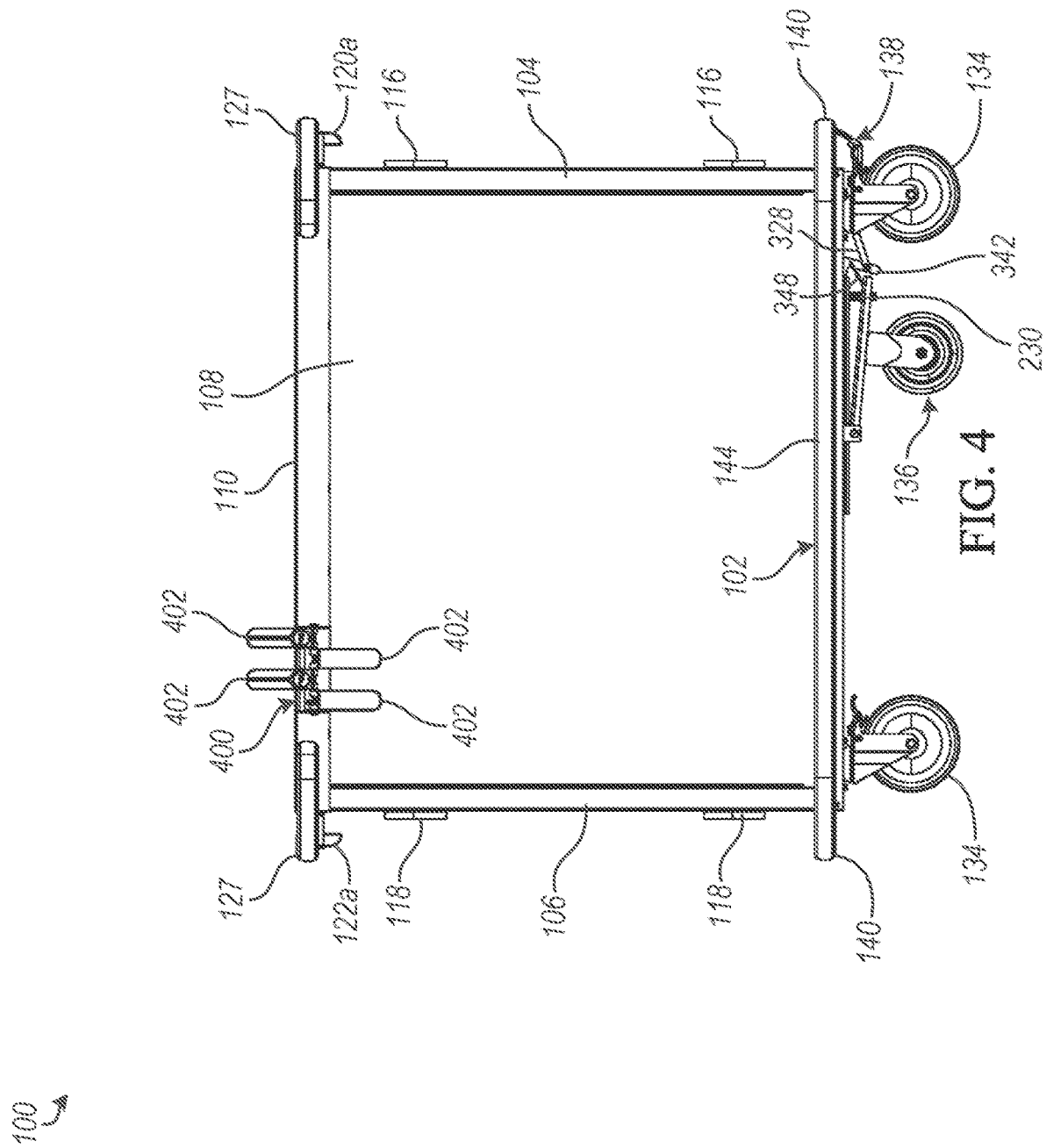
FIG. 4 is a back view of a case cart according to the present disclosure.

FIG. 1 is a top-front perspective view of the case cart 100 according to the present disclosure. FIG. 2 is a bottom-rear perspective view of the case cart 100. FIG. 3 is a front view of the case cart 100. FIG. 4 is a back view of the case cart 100. FIG. 5 is left side view of the case cart 100. FIG. 6 is a right side view of the case cart 100. FIG. 7 is a top view of the case cart 100. With reference generally to FIGS. 1 through 7, the overall configuration of the case cart 100 can be understood.

Referring to FIGS. 1 and 2, the case cart 100 has a cabinet-like construction that is supported on a wheeled chassis 102. The cabinet of the case cart 100 includes a left-side panel 104 opposite a right-side panel 106, and a back panel 108 connecting the left-side panel 104 and the right-side panel 106. The left-side panel 104, right-side panel 106, and the back panel 108 may be attached to a top side of the wheeled chassis 102, and may be substantially orthogonal to a plane formed by the top side of the wheeled chassis 102.

As shown in FIGS. 1 and 2, the left-side panel 104 may be attached near a left edge of the wheeled chassis 102, the right-side panel 106 may be attached near a right edge of the wheeled chassis 102, and the back panel may be attached near a back edge of the wheeled chassis 102. Additionally, the cabinet of the case cart 100 also includes a top panel 110 attached to edges of the left-side panel 104, right-side panel 106, and back panel 108 opposite the edges to which the wheeled chassis 102 is attached. Thus, the left-side panel 104, right-side panel 106, back panel 108, and top panel 110 are carried on the wheeled chassis 102. In an assembled state, the wheeled chassis 102, left-side panel 104, right-side panel 106, back panel 108, and top panel 110 form a cabinet with an opening on one face, but enclosed on all other sides by the wheeled chassis 102 or a respective panel, and having a recess or cavity for storage. As illustrated in FIG. 2, in various implementations, the top panel 110 may have a substantially planar top surface, which may be suitable for use as a multi-purpose work surface.

Doors

As shown in the figures, the case cart 100 includes two doors arranged side-by-side. As illustrated in FIGS. 1 and 3, the case cart 100 may include a left-hand door 112 and/or a right-hand door 114. In various implementations, the case cart 100 may include both a left-hand door 112 and a right-hand door 114. In some examples, the case cart 100 may include only a left-hand door 112. In some embodiments, the case cart 100 may include only a right-hand door 114. The left-hand door 112 may be attached to the left-side panel 104 by one or more hinges 116, and the right-hand door 114 may be attached to the right-side panel 106 by one or more hinges 118. The hinges 116 may allow the left-hand door 112 to pivot or swing through an angle of about 270° from a closed position (shown in FIGS. 1 and 3) to a fully open position, where an exterior surface of the left-hand door 112 is substantially parallel with and/or in contact with an exterior surface of the left-side panel 104. A door catch 120 may be provided on the left-side panel 104 and/or the top panel 110 to receive and hold the left-hand door 112 in the fully open position.

Similarly, the hinges 118 may allow the right-hand door 114 to pivot or swing through an angle of about 270° from a closed position (shown in FIGS. 1 and 3) to a fully open position (see, e.g., FIG. 14). In the fully open position, an exterior surface of the right-hand door 114 is substantially parallel with and/or in contact with an exterior surface of the right-side panel 106. A door catch 122 may be provided on the right-side panel and/or top panel 110 to receive and hold the right-hand door 114 in the fully open-position. In various implementations, the door catch 120 and/or 122 may include a mechanical fastener such as a vertically displaceable pin or latch 120a, 122a, which retains the left-hand door 112 and/or the right-hand door 114 with the respective door catch 120 or 122, and may be manipulated by a user to allow the door to be released. In various implementations, the door catch 120 and/or 122 may alternatively include magnetic fasteners (with corresponding magnets or ferrous members provided on the respective door) can be employed as part of the door catch to releasably secure the doors in their fully open positions.

In various implementations, the left-hand door 112 and/or the right-hand door 114 may be substantially solid or opaque. In various implementations, the left-hand door 112 may include a transparent panel 124, and the right-hand door 114 may include a transparent panel 126. In various implementations, the transparent panel 124 and/or the transparent panel 126 may be formed from an optically transparent polymer or glass, and allow visual inspection of the interior of the case cart 100 without having to open the left-hand door 112 or the right-hand door 114.

Top Panel

As illustrated in FIGS. 1-7, the top panel 110 may form a generally rectangular and planar multi-purpose work surface 125. One or more integrated protective handles 127 can be provided and attached to or integrally formed with the top panel 110. As visible in FIGS. 1 and 7, the case cart 100 is shown with four protective handles 127, with two protective handles 127 on each of the left and right sides of the case cart 100. In various implementations, each protective handle 127 can wrap around a corner of the top panel 110. In various implementations, the protective handles 127 may protrude a distance past the edges defined by the work surface 125 of the top panel 110.

In various implementations, each protective handle 127 may be encapsulated in or formed from a protective material with good shock-absorption properties, such as materials having high viscoelasticity. In various implementations, the protective handles 127 may include a smooth and resilient outer surface made from a soft material (e.g., such as a thermoplastic polymer) that is able to absorb minor impacts to the case cart 100. Thus, the protective handles 127 allow a user to easily grasp the cart, enabling the user to quickly, intuitively, and precisely manipulate and control the case cart 100 during movement of the cart from place to place. Furthermore, by protruding past the edges of the case cart 100 and including a shock and impact-absorbing material, the protective handles 127 also serve as "bumpers," protecting the case cart 100 in the event of a bump, a collision, or an impact.

In various implementations, the protective handles 127 may be formed from thermoplastic polymers that are thermally insulating. For example, the protective handles 127 may be formed from thermally insulating polymers, which may reduce the heat transfer between objects in thermal contact by mitigating heat conduction, convention, and/or radiation. For example, the case cart 100 may be exposed to an environment exhibiting a temperature extreme (e.g., the case cart 100 may be subject to hot water or steam when sanitized, or it may exposed to cold in a refrigerated environment). In such situations, the handles can mitigate the potential for undesirable or uncomfortable heat transfer effects from the handles 127 to a user when grasping the protective handles 127. Furthermore, by protruding beyond the periphery of the case cart 100 defined by the left-side panel 104, right-side panel 106, rear panel 108, and doors 112 and 114, the protective handles 127 (in conjunction with or in addition to the protective handles 140) may prevent any of the panels 104, 106, 108, and/or doors 112 and 114 from physically coming into contact with other objects. In doing so the protective handles 127 and/or 140 can help prevent or reduce heat transfer effects between the panels 104, 106, 108, and/or doors 112 and 114 and objects in the environment, particularly from conduction.

Chassis

FIG. 8 is a bottom view of the case cart 100. As shown in FIGS. 2 and 8, the wheeled chassis 102 of the case cart 100 enables smooth and quiet rolling movement of the case cart 100, allowing it to function as a mobile carrier for the transport of items and as a mobile work station or work platform. The wheeled chassis 102 includes a generally rectangular frame having a front longitudinally extending rail 128, a rear longitudinally extending rail 130, and a plurality of cross rails 132. The front longitudinally extending rail 128 may be positioned such that its front edge is substantially aligned with the outer surface of the left-hand door 112 and the right-hand door 114, and extend a length between the outer surface of the left-side panel 104 and the outer surface of the right-side panel 106. Similarly, the rear longitudinally extending rail 130 may be positioned such that its rear edge is substantially aligned with the outer surface of the back panel 108, and extends a length between the outer surface of the left-side panel 104 and the outer surface of the right-side panel 106. In various implementations, a long axis of the front longitudinally extending rail 128 may be substantially parallel to a long axis of the rear longitudinally extending rail 130.

The cross rails 132 may extend between and connect the front longitudinally extending rail 128 and the rear longitudinally extending rail 130. In various implementations, a long axis of each cross rail 132 may be substantially orthogonal to the long axis of the front longitudinally extending rail 128 and the long axis of the rear longitudinally extending rail 130. In various implementations, as illustrated in FIGS. 2 and 8, the wheeled chassis 102 may include one to five cross rails 132.

The wheeled chassis 102 may include a plurality of freely swiveling caster wheels 134. A caster wheel 134 may be coupled to a left end and a right end of the front longitudinally extending rail 128. Similarly, a caster wheel 134 may be coupled to a left end and a right end of the rear longitudinally extending rail 130. Thus, a caster wheel 134 may be provided at each corner of the wheeled chassis 102. In various implementations, a non-swiveling fifth wheel assembly 136 may be attached to one or more of the cross rails 132. As will be described in detail, the fifth wheel assembly 136 may be attached to the wheeled chassis 102 near the right side of the case cart 100, and be lowered to contact the ground by an actuation mechanism 138 attached to a side of the wheeled chassis 102 (e.g., the right side of the chassis). In various implementations, the actuation mechanism 138 may be attached to the first cross rail 132 from, e.g., the right of the case cart 100, and the fifth wheel assembly 136 may be attached to the second and third cross rails 132 from, e.g., the right of the case cart 100.

FIG. 9 is an exploded perspective detail view showing the fifth wheel assembly 136 and actuation mechanism 138 in greater detail. As shown in FIG. 9, the fifth wheel assembly 136 may include a base plate 202 having a main portion 204, a pair of connecting portions 206 connected to the front and rear edges of the main portion 204, and a winged portion 208 attached to each connecting portion 206. The main portion 204 and the winged portions 208 may have planar surfaces that are substantially parallel, while the connecting portions 206 may have planar surfaces that are substantially orthogonal to the planar surfaces of the main portion 204 and the winged portions 208. Each connecting portion 206 may have a tab 210 with a planar surface substantially parallel to the planar surface of the connecting portion 206.

The base plate 202 may be mounted to the wheeled chassis 102 by a plurality of fasteners 212 received through a plurality of mounting apertures 214 formed through the winged portions 208, and a plurality of corresponding mounting apertures 216 formed through the second cross rail 132 from the left and the third cross rail 132 from the left.

The fifth wheel assembly 136 may also include a wheel mounting plate 218. The wheel mounting plate 218 may include a main portion 220 and a pair of vertical portions 222. The planar surface of the main portion 220 may be substantially orthogonal to the planar surfaces of the vertical portions 222. A mounting aperture 224 may be formed through each vertical portion 222 near the left end of the wheel mounting plate 218, and a bolt 226 may be received through the mounting apertures 224 and corresponding mounting apertures 228 formed through the tabs 210. Assembled, the wheel mounting plate 218 may freely pivot about the long axis of the bolt 226. One or more compression springs 230 may be positioned between the wheel mounting plate 218 and the base plate 202 near the right end of the wheel mounting plate 218. Assembled, the compression springs 230 may function to bias the right end of the wheel mounting plate 218 away from the base plate 202, while the left end of the wheel mounting plate 218 remains attached to the tabs 210 and pivots about the long axis of the bolt 226.

The fifth wheel assembly 136 may also include a wheel assembly 232. The wheel assembly 232 may include a base plate 234 with a pair of vertical portions 236 attached to the base plate 234. The pair of vertical portions 236 may extend away from the base plate 234 in a direction substantially orthogonal to the planar surface of the base plate 234. A plurality of mounting apertures 238 may be formed through the base plate 234, and the base plate 234 may be attached to the wheel mounting plate 218 by a plurality of fasteners 240 received through the plurality of mounting apertures 238 and a corresponding plurality of mounting apertures 242 formed through the main portion 220 of the wheel mounting plate 218.

A mounting aperture 244 may be formed through each of the vertical portions 236. The wheel assembly 232 may also include a wheel 246 having a central aperture 248 formed through the wheel 246 at the central axis of the wheel 246. The wheel 246 may be rotatably coupled to the wheel assembly 232 by a bolt 250 received through the mounting apertures 244 and the central aperture 248. Assembled, the wheel 246 may freely rotate along its central axis, which is coaxial with the bolt 250.

The actuation mechanism 138 may include a foot pedal 302 attached to a foot pedal mount 304. The foot pedal mount 304 may include a main plate 306, a foot pedal mounting plate 308, and a pair of vertical tabs 310. The planar surface of the foot pedal mounting plate 308 may be rotated such that the angle between the planar surface of the foot pedal mounting plate 308 and the planar surface of the main plate 306 may be in a range of between about 90° and about 180°. The planar surfaces of the vertical tabs 310 may be substantially orthogonal to the planar surface of the main plate 306. The foot pedal 302 may be attached to the foot pedal mounting plate 308.

The actuation mechanism 138 may further include a mounting bracket 312 having a main plate 314 and a pair of vertical tabs 316. The vertical tabs 316 may have planar surfaces substantially orthogonal to the planar surface of the main plate 314. A plurality of mounting apertures 318 may be formed through the main plate 314, and the mounting bracket 312 may be attached to corresponding mounting apertures 320 formed through the first cross rail 132 from the right.

The foot pedal mount 304 may be pivotally coupled to the mounting bracket 312 by fasteners 322 received through mounting apertures 324 in the vertical tabs 310 and corresponding mounting apertures 326 in the vertical tabs 316. Assembled, the foot pedal mount 304 may freely rotate about the axis formed by the center of the mounting apertures 324 and the mounting apertures 326. The actuation mechanism 138 may also include a linear linkage member 328. The linear linkage member 328 may have a mounting aperture 330 formed through the right end, and a mounting aperture 332 formed through the left end. The linear linkage member 328 may be coupled to the foot pedal mount 304 by a bolt 334 received through the mounting aperture 332 and corresponding mounting apertures 336 formed through the vertical tabs 310 of the foot pedal mount 304. Assembled, the linear linkage member 328 may freely pivot at the right end about the long axis of the bolt 334.

The actuation mechanism 138 may also include a linkage member forming an L-shape, such as right-angle linkage member 338. The right-angle linkage member 338 may have a mounting aperture 340 near a first end, a mounting aperture 342 near a center, and a mounting aperture 344 near a second end. The right-angle linkage member 338 may be coupled to the mounting aperture 332 of the linear linkage member 328 by a bolt 346. Assembled, the linear linkage member 328 and the right-angle linkage member 338 may freely pivot about the long axis of the bolt 346.

The right-angle linkage member 338 may be coupled to the wheel mounting plate 218 by a linkage clip 348. The linkage clip 348 may be a wire-shaped body bent to have a bent central portion and two free ends. The bent central portion of the linkage clip 348 may be received through the mounting aperture 342 of the right-angle linkage member 338, while the free ends may be received through mounting apertures 252 near the right end of the main portion 220 of the wheel mounting plate 218. The free ends of the linkage clip 348 may be bent or hooked, with the bent or hooked portions being fully received through the mounting apertures 252 to assist with the mechanical connection between the linkage clip 348 and the main portion 220 of the wheel mounting plate 218.

The right-angle linkage member 338 may be further coupled to the base plate 202 by a bolt 254 received through mounting apertures 256 formed through each of the connecting portions 206 of the base plate 202 near the right end and the mounting aperture 344 of the right-angle linkage member 338. Assembled, the right-angle linkage member 338 may freely pivot about the long axis of the bolt 254.

When the user applies a force (sufficient to overcome the spring force of the compression springs 230) to the foot pedal 302, the force is imparted to the foot pedal mounting plate 308, main plate 306, and vertical tabs 310 of the foot pedal mount 304, causing the foot pedal mount 304 to pivot about the axis formed by the centers of the mounting apertures 324 of the foot pedal mount 304 and the centers of the mounting apertures 326 of the mounting bracket 312. As the foot pedal mount 304 rotates, the linear linkage member 328 is pulled to the right by the bolt 334 received through the mounting aperture 330 of the linear linkage member 328 and the mounting aperture 336 of the foot pedal mount 304. In turn, the linear linkage member 328 pulls the first end of the right-angle linkage member 338 up and to the right by the bolt 346 received through the mounting aperture 332 of the linear linkage member 328 and the mounting aperture 340 of the right-angle linkage member 338.

As a result, the linear linkage member 328 pivots in a counter-clockwise direction about the long axis of the bolt 254 received through the mounting aperture 344 at the second end of the right-angle linkage member 338. As the right-angle linkage member 338 rotates, the mounting aperture 342 at the center of the right-angle linkage member 338 moves up, pulling the linkage clip 348 up. As the linkage clip 348 is pulled up, the mechanical connection between the linkage clip 348 and the area around the mounting apertures 252 of the wheel mounting plate 218 pulls the right side of the wheel mounting plate 218 up, lifting the connected wheel 246 away from the ground. Thus, when the pedal 302 is in a first position, the wheel 246 is lowered to be in contact with the ground. When the pedal 302 is in a second position, the wheel 246 is lifted away from the ground.

In operation, the fifth wheel assembly 136 may vary and/or increase the overall stability and/or maneuverability of the case cart 100. Under certain maneuvering conditions, the user may manipulate the actuation mechanism 138 to lower the wheel 246 to contact the ground. In the lowered position, the wheel 246 may extend further towards the ground than the caster wheels 134. For example, in the lowered position, the wheel 246 may extend past a plane formed by the contact point of each caster wheel 134 when they are in contact with the ground.

When the wheel 246 is in the lowered position, it forms a pivot point for the case cart 100, enabling simultaneous contact with the ground between either: (1) the wheel 246 and the pair of caster wheels 134 at the left side of the case cart 100; or (2) the wheel 246 and the pair of caster wheels 134 at the right side of the case cart 100. As a result, in the lowered position, the wheel 246 acts as a pivot point for the case cart 100 while shortening the effective wheelbase of the cart, providing a different manner in which to maneuver the cart and increasing the overall maneuverability and stability of the case cart.

Furthermore, by providing a foot-actuated foot pedal 302 and foot pedal mount 304, the user may easily engage the fifth wheel assembly 136 using a foot, freeing the user's hands to control the case cart 100 using the protective handles 127.

The wheeled chassis 102 may include one or more protective handles 140 similar to the protective handles 127 at the top panel 110. A protective handle 140 can be provided at each corner of the wheeled chassis 102. Additionally, a front protective rail cover 142 may be attached to the front longitudinally extending rail 128 and extend between protective handles 140 at the left and right sides of the wheeled chassis 102. Similarly, a rear protective rail cover 144 may be attached to the rear longitudinally extending rail 130 and extend between protective handles 140 at the left and right sides of the wheeled chassis 102. In various implementations, the protective handles 140, the front protective rail cover 142, and the rear protective rail cover 144 may be formed from or include any of the materials previously described with respect to the protective handles 127. Thus, by including a shock and impact-absorbing material and protruding past the edges of the case cart 100, the protective handles 140, front protective rail cover 142, and rear protective rail cover 144 may serve as "bumpers," protecting the case cart 100 from bumps, collisions and impacts.

In various implementations, the wheeled chassis 102, left-side panel, right-side panel 106, and top panel 110 may be constructed substantially of non-corrosive 300- or 400-series stainless steel, such as SAE 304 stainless steel. The left-hand door 112 and the right-hand door 114 may be constructed substantially of non-corrosive 300- or 400-series stainless steel (such as SAE 304 stainless steel) and/or glass (a nonporous, inert material). In various implementations, a plurality of easily adjustable and removable shelves made of non-corrosive 300- or 400-series stainless steel (such as SAE 304 stainless steel) may be provided on the interior of the case cart 100.

In various implementations, a plurality of apertures or weep holes 158 may be formed through the wheeled chassis 102 and/or the shelves in order to enable airflow and allow liquids to quickly drain from the interior of the case cart 100. This configuration provides for a case cart 100 with an easily adjustable shelving configuration that is nevertheless easy to clean. For example, the case cart 100 may be sanitized by spraying the interior and exterior surfaces with a solvent and/or a disinfectant. The noncorrosive materials and weep holes prevent liquid from collecting in the case cart 100 and inhibit corrosion.

Analogously, a plurality of drainage aperture or weep holes, such as weep holes 258 may be provided in in the fifth wheel assembly 136 (such as through the main portion 204 of the base plate 202) to allow the fifth wheel assembly 136 to dry thoroughly after cleaning.

In various implementations, the case cart 100 may include a variety of accessories in the recessed portion 152 or the recessed portion 154. For example, in addition to or in lieu of the document holder 156, a swing-up handle 164 may be disposed in the recessed portion 152 (as illustrated in FIGS. 1 and 6). The swing-up handle 164 may be pivotally coupled to walls forming the recessed portion 152 such that a user is able to rotate an end of swing-up handle 164 out of the recessed portion 152 and use the swing-up handle 164 to assist in maneuvering the cart.

Case Cart Supply Configuration and Status Indicator

As shown in FIGS. 1-7, the case cart 100 may include a status indicator 400 that allows attending staff (e.g., operating room personnel, triage personnel, or other attending personnel), supply management staff, and/or fulfillment staff to quickly and effectively communicate various supply configurations, conditions, and or statuses associated with the case cart 100 as it is utilized by various users throughout a work cycle. The status indicator 400 may include a plurality of markers or flags 402, each of which may have a color or text to clearly and easily convey a status or information. As shown in FIGS. 1-7, two flags 402 are in an raised position (such that the distal portions of the flags 402 substantially extend above or protrude over the top panel 110), while two flags 402 are in a lowered position (such that the distal portions of the flags 402 substantially do not protrude over the top panel 110). Through positioning the various flags 402 in a raised or lowered position, the configuration and/or status of the case cart 100 (e.g., that the cart is configured for a certain function or application, or that the cart is fully stocked, or that the cart requires restocking, etc.) can be readily identified.

FIG. 10 is an exploded perspective detail view showing the status indicator 400 in greater detail. FIG. 10A is a cross-sectional side view showing additional details that may be associated with some embodiments of the status indicator 400. As illustrated in FIG. 10, the status indicator 400 includes a plurality of flags 402 and a mounting bracket 404. The mounting bracket 404 may include a substantially planar main portion or base 406, and opposing vertical flanges 408 at each of the left and right lateral sides of the substantially planar base 406. The planar surfaces of each of the vertical flanges 408 may be substantially orthogonal to the planar surface of the base 406. A mounting aperture 410 may be formed through a central part of each of the vertical flange 408. As best seen in FIG. 10A, an upper end portion of the base 406 of the mounting bracket 404 can include a wall 412 protruding from the base 406 (e.g., the material of the mounting bracket 404 may be bent or folded over at the top of the mounting bracket 404 to create the wall 412 that forms a substantially planar surface in a plane parallel to and offset from the planar surface of the base 406 (i.e., in a direction away from the back panel 108).

As illustrated in FIG. 10A, in some examples, a portion of the mounting bracket 404 at a lower end portion of the base 406 (e.g., at an end opposite the wall 412) may be bent or folded to define a raised portion 407. The raised portion 407 may form a substantially planar surface in a plane parallel to and offset from the planar surface of the base 406 in a direction towards the wall 412. In various implementations, the planar surface of the raised portion 407 may be between the planar surface of the base 406 and the planar surface of the wall 412 in an axis orthogonal to the planar surface of the base 406 (e.g., the planar surface of the raised portion 407 may be offset away from the back panel 108 a distance less than the planar surface of the wall 412).

One or more thickened mounting portions 414 may be provided at a proximal end of each flag 402, and a mounting aperture 416 may be formed through each mounting portion 414. A central axis of each mounting aperture 416 may be substantially orthogonal to a long axis of the respective flag 402. Each of the flags 402 may be pivotally coupled to the mounting bracket 404 by a pin or rod 418. The rod 418 may be received through the mounting apertures 416 of each flag 402, and through the mounting apertures 410 of each vertical flange 408. Assembled, each of the flags 402 may pivot about the central axis of the mounting apertures 410 and the mounting apertures 416 (also the long axis of the rod 418) between the lowered position and the raised position.

Each flag 402 may include a recessed portion 420 at the end near the mounting portions 414, and a magnet 422 (such as a high-temperature neodymium magnet) may be disposed in each recessed portion 420. Each magnet 422 may be covered by a cover 424 such that the magnet 422 and the recessed portion 420 is substantially sealed (e.g., from water or other fluids that may be corrosive to the magnet 422) from the external environment. In various implementations, the mounting bracket 404, including the base 406, vertical flanges 408, and the wall 412 may be formed of a non-corrosive ferrous material, such as a 400-series stainless steel. In various implementations, the flag 402 and the cover 424 may be formed of a non-corrosive non-ferrous material, such as a polymer. In various implementations, the cover 424 may be ultrasonically welded so as to be sealingly attached to the flag 402.

In the lowered position, distal ends of the flags 402 opposite the mounting portions 414 may be oriented towards the bottom of the case cart 100 (i.e., the ground), and, in some examples (as shown in FIG. 10), the exterior surface of the cover 424 may be substantially in contact with the planar surface of the base 406. In various implementations (as shown in FIG. 10A), the exterior surface of the cover 424 may be substantially in contact with the planar surface of the raised portion 407. The magnetic forces between the magnet 422 and the ferrous material of the base 406 and/or the raised portion 407 may hold the flag 402 in the lowered position until the user exerts sufficient force to overcome the magnetic forces. Similarly, in the raised position, a surface of the flag 402 opposite the exterior surface of the cover 424 may contact the external surface of the wall 412. The magnetic forces between the magnet 422 and the ferrous material of the wall 412 may hold the flag 402 in the raised position until the user exerts sufficient force on the flag 402 to overcome the magnetic forces and pivot the flag 402 toward the lowered position.

In various implementations, one or more of the flags 402 may be secured to the mounting bracket 404 by a friction hinge (also known as a torque hinge) or a locking hinge. In examples where the flag 402 is secured to the mounting bracket 404 by a friction hinge or a locking hinge, the magnet 422 may be optionally omitted. In operation, the friction hinge or the locking hinge may secure the flag 402 in the raised position or in the lowered position.

As an assembly, the status indicator 400 may be coupled to an edge of the top panel 110. For example, as shown in the figures, the assembled status indicator 400 may be attached to the top panel 110 at the rear of the case cart 100 such that the flags 402 are positioned to minimize any interference between operation of the flags 402 and the left-hand door 112, right-hand door 114, door catch 120, and/or door catch 122.

In addition to providing for easy, ergonomic operation by minimizing interferences between the parts of the case cart 100, the status indicator 400 may provide additional benefits over conventional designs by being easy to clean. For example, each flag 402 may be formed of a non-corrosive material—such as a polymer—having smooth, contoured surfaces, enabling the flag 402 to shed liquids and dry thoroughly. Similarly, ultrasonic welds between the covers 424 and the bodies of the flags 402 seal the recessed portions 420 and the magnets 422 against the external environment (e.g., from fluids or corrosive materials), providing a retention mechanism that does not retain liquids. Additionally, the non-corrosive ferrous mounting bracket 404 enables magnetic retention of the flags 402 in the raised or lowered position while shedding fluids and providing corrosion resistance.

Case Cart Sanitation Status Indicator

FIG. 11 is an exploded perspective detail view showing a case cart sanitation status indicator 500. FIG. 12 is a front view of the case cart 100 showing the status indicator 500. The status indicator 500 includes a front plate 502, an inner decal 503, a mounting disc 504, an outer decal 505, and a back plate 506. The front plate 502 may have a main portion 508 defining a substantially planar surface. The main portion 508 may have a substantially rectangular shaped upper part terminating at a top edge 510 and a substantially semi-circular lower part below the upper part. The semi-circular bottom edge 512 of the lower part may extend in a direction away from the top edge 510, and the diameter of the lower part may be substantially parallel with the top edge 510.

The front plate 502 may also include a vertical extension or portion 514 at each of the left and right edges of the main portion 508. The vertical extensions 514 may define substantially planar surfaces that are substantially orthogonal to the planar surface of the main portion 508. A winged portion 516 may be attached to each vertical extensions 514 near the top of each vertical extension 514. The winged portions 516 may define substantially planar surfaces that are substantially parallel to the planar surface of the main portion 508.

A central aperture 518 may be formed through the main portion 508 near its center. An arced slot 520 may be formed through the main portion 508 and positioned such that it is concentric with both the central aperture 518 and the semi-circular bottom edge 512. The arc of the arced slot 520 may be about 180° and extend towards the semi-circular bottom edge 512. The chord of the arced slot 520 may be substantially parallel to the top edge 510. A mounting aperture 522 may be formed through each winged portion 516.

The mounting disc 504 may be a substantially circular disc having a first surface 524 opposite a second surface 526. The first surface 524 may face towards the front plate 502, and the second surface 526 may face towards the back plate 506. A central aperture 528 may be formed through a center of the mounting disc 504. An additional aperture 530 may be formed through the mounting disc 504.

The inner decal 503 may be a substantially circular sheet having a diameter less than a diameter of the mounting disc 504. A central aperture 532 may be formed through a center of the inner decal 503. An additional aperture 534 may be formed through the inner decal 503. The inner decal 503 may be affixed to the first surface 524 of the mounting disc 504 such that the central aperture 532 of the inner decal 503 is substantially concentric with the central aperture 528 of the mounting disc 504 and aperture 534 is substantially concentric with aperture 530.

The outer decal 505 may be a substantially circular sheet having a diameter less than or equal to the diameter of the mounting disc 504. A central aperture 536 may be formed through a center of the outer decal 505. The outer decal 505 may be affixed to the second surface 526 of the mounting disc 504 such that the central aperture 536 of the outer decal 505 is substantially concentric with the central aperture 528 of the mounting disc 504.

The back plate 506 may include a main portion 538 defining a substantially planar surface. The main portion 538 may be substantially rectangular, and have a top edge 540 opposite a bottom edge 542. The back plate may also include a vertical extension 544 attached at each of the left and right edges of the main portion 538. The vertical extensions 544 may define planar surfaces substantially orthogonal to the planar surface of the main portion 538. A winged portion 546 may be attached to each vertical extension 544 near a top of the back plate 506. The winged portions 546 may define planar surfaces substantially parallel to the planar surface of the main portion 508. A mounting aperture 548 may be formed through the main portion 508 near the bottom edge 542. The mounting aperture 550 may be substantially centered with respect to the left and right edges of the main portion. A mounting aperture 550 may be formed through each winged portion 546.

The front plate 502, mounting disc 504 (with the inner decal 503 and the outer decal 505 affixed), and the back plate 506 may be assembled such that the mounting disc 504 is positioned between the front plate 502 and the back plate 506 with the first surface 524 of the mounting disc 504 facing the front plate 502 and the second surface 526 of the mounting disc 504 facing the back plate 506. The central aperture 518 of the front plate 502 may be coaxially aligned with the central aperture 532 of the inner decal 503, the central aperture 528 of the mounting disc 504, the central aperture 536 of the outer decal 505, and the mounting aperture 548 of the back plate 506. The aperture 534 of the inner decal 503 and the aperture 530 of the mounting disc 504 may be aligned so as to be fully visible through the arced slot 520.

The vertical extension 514 on the left side of the front plate 502 may be positioned over and in contact with the vertical extension 544 on the left side of the back plate 506, and the vertical extension 514 on the right side of the front plate 502 may be positioned over and in contact with the vertical extension 544 on the right side of the back plate 506. This contact between the vertical extensions 514 and the vertical extensions 544 may substantially inhibit rotation of the front plate 502 with respect to the back plate 506 about the axis defined by the central aperture 518 and the mounting aperture 548. A bolt 552 may be received through the central aperture 518 of the front plate 502, the central aperture 532 of the inner decal 403, the central aperture 528 of the mounting disc 504, the central aperture 536 of the outer decal 505, and the mounting aperture 548 of the back plate 506 to secure the front plate 502, inner decal 503, mounting disc 504, outer decal 505, and back plate 506 to each other while still allowing the mounting disc 504, the inner decal 503, and the outer decal 505 to freely rotate about the long axis of the bolt 552.

The vertical extension 514 on the left side of the front plate 502 may be positioned over and in contact with the vertical extension 544 on the left side of the back plate 506, and the vertical extension 514 on the right side of the front plate 502 may be positioned over and in contact with the vertical extension 544 on the right side of the back plate 506. This contact between the vertical extensions 514 and the vertical extensions 544 may substantially inhibit rotation of the front plate 502 with respect to the back plate 506 about the axis defined by the central aperture 518 and the mounting aperture 548. Assembled, the winged portions 516 of the front plate 502 may be disposed over the respective wing portions 546 of the back plate 506 such that each mounting aperture 522 is aligned with a respective mounting aperture 550.

The assembled status indicator 500 may be attached to the left-hand door 112 or the right-hand door 114. As shown in FIG. 11, in various implementations, the assembled status indicator 500 may be attached to an interior surface of the right-hand door 114. For example, a pair of mounting apertures 146 may be formed in the interior surface of the right-hand door 114 near the top of the door. A fastener 556 may be received through each aligned set of mounting apertures 522, mounting apertures 550, and mounting apertures 146 to attach the assembled status indicator 500 to the right-hand door 114.

As shown in FIG. 12, when the status indicator 500 is mounted to the right-hand door 114, the bottom edge 542 of the back plate 506 is positioned low enough to be visible to the user through the transparent panel 126 of the right-hand door 114. A portion of the mounting disc 504 and/or the outer decal 505 protrudes below the bottom edge 542, and is similarly visible through the transparent panel 126.

A plunger or pin 554 may be received through the arced slot 520 of the front plate 502, aperture 534 of the inner decal 503, and aperture 530 of mounting disc 504 in order to allow the user to rotate the mounting disc 504. In operation, the degrees of rotation of the mounting disc 504 will be limited to the degrees of the arc of the arced slot 520. In the example of FIG. 11, the arc of the arced slot 520 is a 180° arc. As the pin 554 is moved through 180° of rotation allowed by the arced slot 520, the mounting disc 504 with the affixed inner decal 503 and outer decal 505 are rotated along with the pin 554.

Assembled, the arc of the arced slot 520 is substantially concentric with the circumference of the outer decal 505. Additionally, the chord of the arc of the arced slot 520 is substantially parallel to the bottom edge 542 of the back plate 506, and the arc of the arced slot 520 extends below the bottom edge 542. Thus, when the inner decal 503 and the outer decal 505 are divided in half along diameters parallel to the bottom edge 542, the information displayed on the bottom half of the inner decal 503 will be visible through the arced slot 520 at the same time the information displayed on the bottom half of the outer decal 505 is visible below the bottom edge 542 through the transparent panel 126. Conversely, the information displayed on the top half of the inner decal 503 will be occluded by the main portion 508 of the front plate 502, and the information displayed on the top half of the outer decal 505 will be occluded by the main portion 538 of the back plate 506.

As the pin 554 is rotated 180° through the arc of the arced slot 520, the top portion of the inner decal 503 will be rotated to be below the bottom portion and thus visible through the arced slot 520, while the bottom portion of the inner decal 503 will be rotated to be above the bottom portion and occluded by the main portion 508. Simultaneously, the top portion of the outer decal 505 will be rotated to be below bottom portion and thus visible below the bottom edge 542, while the bottom portion of the outer decal 505 will be occluded by the main portion 538.

Thus, by rotating the pin 554 from one end of the arced slot 520 to the opposite end, the status indicator 500 functions as a binary status indicator. When the pin 554 is in a first position at one end of the arced slot 520, information on the top portion of the inner decal 503 is displayed through the arced slot 520 as information on the top portion of the outer decal 505 is simultaneously visible through the transparent panel 126. When the pin 554 is at a second position at the opposite end of the arced slot 520, information on the bottom portion of the inner decal 503 is displayed through the arced slot 520 as information on the bottom portion of the outer decal 505 is simultaneously visible through the transparent panel 126.

The status indicator 500 of FIGS. 11 and 12 may be mounted such that it is entirely on the interior of the case cart 100. The left-hand door 112 and the right-hand door 114 may both have locking latches 150. Thus, once the left-hand door 112 and the right-hand door 114 are both closed and locked, the status indicator 500 (including the pin 554 used to change the status displayed through the arced slot 520 and the transparent panel 126) will be secured inside the case cart 100, preventing unauthorized users from tampering with (intentionally or inadvertently) the status shown by the status indicator 500 while still allowing users to quickly ascertain the status through the transparent panel 126.

FIG. 11A is a perspective view showing the interior-facing side of an alternate sanitation status indicator 900 for the case cart 100. FIG. 11B is a perspective view showing the door-facing side of the alternate status indicator 900 for the case cart 100. FIG. 11C is an exploded perspective detail view showing the interior-facing side of the alternate status indicator 900 for the case cart 100. FIG. 11D is an exploded perspective detail view showing the door-facing side of the alternate status indicator 900 for the case cart 100. FIG. 11E is a front view of a decal 1000 used in the alternate status indicator 900. As shown in FIGS. 11A-11D, the status indicator 900 may include a front plate 902 and a mounting disc 904. The front plate 902 may have a main portion 906 having a first surface 908 opposite a second surface 910. The first surface 908 and the second surface 910 may each define a substantially planar surface and be parallel with one another.

The main portion 906 may also have a first edge 912 opposite a second edge 914. The front plate 902 may also include a vertical extension or portion 916 at each of the left and right edges of the main portion 906. The vertical extensions 916 may define substantially planar surfaces that are substantially orthogonal to the first surface 908 and/or the second surface 910. The vertical extensions 916 may extend a distance from the first edge 912 towards the second edge 914. In various implementations, each vertical extension 916 may extend a distance from the first edge 912 toward the second edge 914 but not reach the second edge 914. For example, each vertical extension 916 may have an edge 918 at a position between the first edge 912 and second edge 914.

A winged portion 920 may be attached to each vertical extension 916 near the top of each vertical extension 916. The winged portions 920 may define substantially planar surfaces that are substantially parallel to the first surface 908 and/or the second surface 910. In various implementations, each winged portion 920 may extend in a direction away from the main portion 906.

A central aperture 922 may be formed through the main portion 906. In various implementations, the central aperture 922 may be centered between the left vertical extension 916 and the right vertical extension 916, and located near the second edge 914. One or more recessed portions 924, such as left recessed portion 924 and right recessed portion 924 may be formed on the main portion 906 proximate the central aperture 922. In various implementations, the recessed portions 924 may be formed such that a recess or cavity is formed on the second surface 910. In various implementations, the left recessed portion 924 may be positioned to the left of the central aperture 922 such that its center is coaxial with a center of the central aperture 922 along a line parallel to the first edge 912 and/or the second edge 914. In various implementations, the right recessed portion 924 may be positioned to the right of the central aperture 922 such that its center is coaxial with a center of the central aperture 922 along a line parallel to the first edge 912 and/or the second edge 914. In various implementations, one or more of the recessed portions 924 may be apertures formed through the main portion 906. A mounting aperture 926 may be formed through each winged portion 920.

The mounting disc 904 may be a substantially circular disc having a first surface 928 opposite a second surface 930. The mounting disc 904 may include a tab 934 that protrudes past an outer circumference of the mounting disc 904. A central aperture 936 may be formed through the mounting disc 904 at its center. One or more detents 938 may be positioned on the first surface 928. In various implementations, each detent 938 may be a spring-loaded ball bearing detent, such as a ball plunger-style detent. Each detent 938 may be received in a corresponding detent housing 939, which may extend a distance away from the second surface 930. In various implementations, a left detent 938, the central aperture 936, a right detent 938, and the tab 934 may be positioned such that a center of each of the detents 938, the central aperture 936, and the tab 934 are coaxially aligned along a diameter of the mounting disc 904.

The decal 1000 may be affixed to the first surface 928, the second surface 930, or decals 1000 may be affixed to both the first surface 928 and the second surface 930. As illustrated in FIG. 11E, the decal 1000 may be substantially circular, and divided along a diameter 1002 into a first half 1004 and a second half 1006. A central aperture 1008 may be formed through a center of the decal 1000, and the center of the central aperture 1008 may be substantially coincident with the diameter 1002. One or more apertures 1010 may be positioned along the diameter 1002 to either side of the central aperture 1008. The first half 1004 of the decal 1000 may have a first coloration and a first design, and the second half 1006 of the decal 1000 may have a second coloration and a second design. For example, as shown in FIG. 11E, the first coloration may be green and the first design may include the text "Clean" and a cross symbol (to indicate that the case cart 100 has a clean and/or sanitized status). In various implementations, the second coloration may be red and the second design may include the text "Biohazard" and a biohazard symbol (to indicate that the case cart 100 has a dirty, biohazardous, and/or un-sanitized status).

When a decal 1000 is affixed to the first surface 928 of the mounting disc 904, the diameter 1002 may be aligned such that the centers of the central aperture 936, the detents 938, and a long axis of the tab 934 are coaxially aligned. The central aperture 936 of the mounting disc 904 may be substantially concentric with the central aperture 1008 of the decal 1000, and each detent 938 may be substantially concentric with a corresponding aperture 1010 such that the detent 938 is received through the aperture 1010.

When a decal 1000 is affixed to the second surface 930 of the mounting disc, the diameter 1002 may be aligned such that the centers of the central aperture 936, detent housings 939, and the long axis of the tab 934 are coaxially aligned. The central aperture 936 of the mounting disc 904 may be substantially concentric with the central aperture 1008 of the decal 1000, and each detent housing 939 may be substantially concentric with a corresponding aperture 1010 such that the detent housing 939 is received through the aperture 1010. In examples where a decal 1000 is affixed to both the first surface 928 and the second surface 930, the decals 1000 may be aligned such that the first halves 1004 of each decal 1000 are oriented in the same direction relative to the mounting disc 904, and the second halves 1006 of each decal 1000 are likewise oriented in the same direction relative to the mounting disc 904.

Referring back to FIGS. 11A-D, the front plate 902 and the mounting disc 904 (with a decal 1000 affixed to the second surface 930 and/or a decal 1000 affixed to the first surface 928) may be assembled such that the first surface 928 of the mounting disc 904 is oriented to face the second surface 910 of the front plate 902, and the central aperture 936 is coaxially aligned with the central aperture 922 of the front plate 902. A pin 940 may be received through the central aperture 922 and the central aperture 936 to secure the mounting disc 904 to the front plate 902. Assembled, the front plate 902 may freely rotate between a first position, where the tab 934 of the mounting disc 904 is rotated to be in contact with the bottom edge 918 of the left vertical extension 916, and a second position (illustrated in FIGS. 11A-11D), where the tab 934 of the mounting disc 904 is rotated to be in contact with the edge 918 of the right vertical extension 916.

In the first position, each detent 938 may be received in a corresponding recessed portion 924. Thus, in the first position, the detents 938 received in the corresponding recessed portions 924 may secure the mounting disc 904 in the first position until the user applies sufficient force or pressure to the tab 934 to overcome the detents 938. As the user applies force or pressure to the tab 934, the force is transferred to the contact point between the recessed portion 924 and the detent 938, and when the force overcomes the spring force biasing the detent 938 towards the recessed portion 924, the detent 938 is moved away from the recessed portion 924, allowing the mounting disc 904 to rotate towards the second position. When the mounting disc 904 rotates to the second position, the detents 938 will be once again received in a corresponding recessed portion 924, and the mounting disc 904 will be secured in the second position until the user applies sufficient force or pressure to the tab 934 to move the mounting disc 904 towards the first position.

When the mounting disc 904 is rotated to be in the first position, at least a portion of the first half 1004 of the decal 1000 affixed to the first surface 928 may be visible below the second edge 914, while the main portion 906 occludes the second half 1006. The alternate status indicator 900 may be coupled to the inside of the left-hand door 112 or the right-hand door 114 such that the top edge of the frame of the transparent panel 124 or the transparent panel 126, such as edges 160 or 162, substantially occludes the second half 1006 of the decal 1000 affixed to the second surface 930 when the mounting disc 904 is in the first position, but allows at least a portion of the first half 1004 to be visible through the transparent panel 124 or 126. When the mounting disc is rotated to be in the second position, at least a portion of the second half 1006 of the decal 1000 affixed to the first surface 928 may be visible below the second edge 914 (while the main portion 906 occludes the first half 1004), and at least a portion of the second half 1006 of the decal 1000 affixed to the second surface 930 may be visible through the transparent panel 124 or 126 below the edges 160 or 162 (while the first half 1004 is occluded). Thus, in the first position, the information on the first half 1004 of the decal 1000 is visible to the user (while the information on the second half 1006 is occluded), whether the user views the decal 1000 affixed to the first surface 928 or the decal 1000 affixed to the second surface 930. Similarly, in the second position, the information on the second half 1006 of the decal 1000 is visible to the user (while the information on the first half 1004 is occluded), whether the user views the decal 1000 affixed to the first surface 928 or the decal 1000 affixed to the second surface 930.

FIG. 13 is an exploded perspective detail view showing an alternate status indicator 600 for the case cart 100. FIG. 13A is a front view of a decal 700 used in the alternate status indicator 600. Referring to FIG. 13A, the decal 700 is substantially circular, and may be divided into an inner portion 702 and an outer portion 704. A diameter 706 of the decal 700 may divide the inner portion 702 into an upper half 708 and a lower half 710, and the outer portion 704 into an upper half 712 and a lower half 714. A central aperture 716 may be formed through a center of the decal 700, and an aperture 718 for receiving a plunger or pin is formed through the decal 700. A center of the aperture 718 may be substantially coincident with the diameter 706, and the aperture 718 may be disposed near an outer edge of the inner portion 702.

Referring back to FIG. 13, the alternate status indicator 600 may include a front plate 602, the decal 700, a mounting disc 604, and a back plate 606. The front plate 602 may include a substantially planar main portion 608 having a top edge 610 opposite a bottom edge 612. The front plate 602 may also include a vertical extension or portion 614 at each of the left and right sides of the main portion 608. Planar surfaces of each vertical extension 614 may be substantially orthogonal to the planar surface of the main portion 608. An aperture 616 may be formed through the main portion 608, and an arced slot 618 may be formed through the main portion 608 such that it is concentric with the aperture 616. The arc of the arced slot 618 may be about 180° and extend towards the circumference top edge 610. The chord of the arced slot 618 may be substantially parallel to the top edge 610.

The mounting disc 604 may be a substantially circular disc having a first surface 620 facing the front plate 602 opposite a second surface 622 facing the back plate 606. A diameter of the mounting disc 604 may be greater than or equal to the diameter 706 of the decal 700. A central aperture 624 may be formed through the mounting disc 604 at a center of the mounting disc 604, and an additional aperture 626 for receiving a plunger or pin may be formed through the mounting disc 604. The decal 700 may be affixed to the first side 620 of the mounting disc 604 such that the central aperture 716 of the decal 700 is aligned coaxially with the central aperture 624 of the mounting disc 604, and the aperture 718 is coaxially aligned with the aperture 626.

Optionally, the decal 700 may be omitted and a decal 800 may be affixed to the first side 620 of the mounting disc 604. The decal 700 may be substantially similar to the decal 700, except that the outer portion 704 of the decal 700 is omitted or removed, and only the inner portion 702 is provided.

The back plate 606 may include a main portion 628 defining a substantially planar rectangular surface having a top edge 630 opposite a bottom edge 631. A vertical portion 634 may be attached to each of the left and right edges of the main portion 628, with a planar surface of each vertical portion 634 being substantially orthogonal to the planar surface of the main portion 628. A folded portion 636 may be attached to each vertical portion 634, with each folded portion 636 being folded towards the center of the rear plate 606 such that a planar surface of each folded portion is substantially parallel to the planar surface of the main portion 628. A mounting aperture 638 may be formed through the main portion 628 at a position centered and near the bottom edge 631.

The front plate 602, mounting disc 604 (with the attached decal 700 or decal 800), and back plate 606 may be assembled such that the mounting disc 604 is positioned between the front plate 602 and the back plate 606 with the first surface 620 of the mounting disc 604 facing the front plate 602 and the second surface 622 facing the back plate 606. The aperture 616 of the front plate 602, central aperture 716 of the decal 700, central aperture 624 of the mounting disc 604, and mounting aperture 638 of the back plate 606 may be coaxially aligned, and a bolt 640 may be received through the aperture 616, central aperture 716, central aperture 624, and mounting aperture 638. In the assembled state, the mounting disc 604 (and the affixed decal 700 or decal 800) may freely rotate about the long axis of the bolt 640.

Assembled, the left-side vertical extension 614 of the front plate 602 may be positioned over and in contact with the left-side vertical portion 632 of the back plate 606, and the right-side vertical extension 614 may be positioned over and in contact with the right-side vertical portion 632. Apertures 642 may be formed through each of the vertical extensions 614, and corresponding apertures 644 may be formed through each of the vertical portions 632. Assembled, each aperture 642 may be coaxially aligned with a respective aperture 644. Fasteners 646 may be received through each aligned pairing of aperture 642 and aperture 644 to secure the front plate 602 to the back plate 606. In the assembled state, the contact between the vertical extensions 614 and the vertical portions 632 and the mechanical attachment provided by the fasteners 646 may substantially prevent the front plate 602 and the back plate 606 from rotating or otherwise moving with respect to one another.

In the assembled state, the aperture 718 of the decal 700 may be aligned so as to be fully visible through the arced slot 618. A plunger or pin 648 may be received through the arced slot 618 of the front plate 602, the aperture 718 of the decal 700, and the aperture 626 of the mounting disc 604 to allow the user to rotate the mounting disc 604. In operation, the degrees of rotation of the mounting disc 604 will be limited to the degrees of the arc of the arced slot 618. In the example of FIG. 13, the arc of the arced slot 618 is a 180° arc. As the pin 648 is moved through the 180° of rotation allowed by the arced slot 617, the mounting disc 604 with the affixed decal 700 or decal 800 is rotated along with the pin 648.

In operation, because the arc of the arced slot 618 faces away from the bottom edge 612 of the main portion 608 of the front plate 602, information on the upper half 708 of the inner portion 702 of the decal 700 will visible through the arced slot 618 at the same time as information on the lower half 714 of the outer portion 704 of the decal 700 when the pin 648 is at a first position at a first end of the arced slot 618. Simultaneously, information on the lower half 710 of the inner portion 702 and information on the upper half 712 of the outer portion 704 will be occluded by the main portion 608. When the pin 648 is rotated to a second position at the opposite end of the arced slot 618, the mounting disc 604 and the affixed decal 700 will be rotated such that the information on the lower half 710 of the inner portion 702 and information on the upper half 712 of the outer portion 704 may be simultaneously visible, while information on the upper half 708 of the inner portion 702 and information on the lower half 714 of the outer portion 704 is occluded. Thus, the alternate status indicator 600 may function as a binary indicator, showing a first status when the pin 648 is at the first position and a second status when the pin 648 is at the second position.

In various implementations, decal 800 may be affixed to the mounting disc 604 instead of decal 700. As decal 800 does not have an outer portion 704, the decal 800 will only be visible through the arced slot 618. Thus, examples of the alternate status indicator 600 with the decal 800 may function as a binary indicator by displaying a first status through the arced slot 618 only when the pin 648 is in the first position, and a second status through the arced slot 618 only when the pin 648 is in the second position.

As illustrated in FIG. 13, the alternate status indicator 600 may be mounted such that it is on an exterior surface of a door of the case cart 100. As shown in FIG. 13, examples of the alternate status indicator 600 may be affixed to the exterior surface 148 of the right-hand door 114. In some examples, the alternate status indicator 600 may be affixed to the exterior surface 148 by fasteners 151 received through apertures 650 formed in each folded portion 636 of the back plate 606. Examples of the alternate status indicator 600 may be particularly useful where the doors of the case cart 100 do not include a transparent panel 124 or 126. In such examples, the alternate status indicator 600 may include additional tamper resistant features. For example, the pin 648 may be removable from the alternate status indicator 600, such that the user may remove the pin 648 after moving the pin 648 to the desired first or second position. With the pin 648 removed, unauthorized users will be substantially prevented from intentionally or inadvertently tampering with the status of the case cart 100 displayed through the arced slot 618 and/or below the bottom edge 612 of the front plate 602.

FIG. 13B is a perspective view showing the outer-facing side of an alternate sanitation status indicator 1100 for the case cart 100. FIG. 13C is a perspective view showing the door-facing side of the alternate status indicator 1100. FIG. 13D is a front view of a decal 1200 used in the alternate status indicator 1100. FIG. 13E is a perspective view showing additional features associated with some examples of the alternate status indicator 1100. The alternate status indicator 1100 may be substantially similar to the alternate status indicator 900, with the exception that the winged portions 920 extend in a direction towards the main portion 906 or the center of the front plate 902 (instead of away from the main portion 906, as in the alternate status indicator 900). In various implementations, the decal 1200 may be affixed to the first surface 928 of the mounting disc 904.

As shown in FIG. 13D, the decal 1200 may be substantially similar to the decal 1000 of FIG. 11E. Assembled, the decal 1200 may be affixed to the first surface 928 of the mounting disc 904 such that at least a portion of the first half 1004 of the decal 1200 is visible above the second edge 914 when the mounting disc 904 is in the first position (with the tab 934 rotated to be in contact with the edge 918 of the right-side vertical extension 916, as illustrated in FIGS. 13B, 13C, and 13E), but the second half 1006 of the decal 1200 is occluded by the main portion 906. When the mounting disc 904 is rotated to be in the second position (when the tab 934 is rotated to be in contact with the left-edge 918 of the vertical extension), at least a portion of the second half 1006 of the decal 1200 will be visible above the second edge 914, and the first half 1004 will be occluded by the main portion 906.

As illustrated in FIG. 13E, some examples of the alternate status indicator 1100 include a mounting plate 1102. The mounting plate 1102 may include a plurality of apertures 1104. Assembled, the apertures 1104 may align with the mounting aperture 926 of the winged portions 920, and the mounting plate 1102 may be coupled to the front plate 902 by fasteners 1106 received through the mounting apertures 926 and the apertures 1104. The assembled alternate status indicator 1100 may be coupled to an exterior surface of the left-hand door 112 or the right hand door 114 by a fastening means, such as double-sided foam tape 1108.

FIG. 14 is a partial top-front perspective view of the case cart 100 showing the right-hand door 114 in a partially opened condition (shown in dashed lines) and a fully opened condition (shown in solid lines). As can be seen in FIG. 14 (and with reference to FIGS. 1-7), in the fully opened condition, the right-hand door 114 may be substantially received within a recessed portion 152 formed in the right-side panel 106, and secured by the door catch 122. Similarly, the left-side panel 104 may include an analogous recessed portion 154. As shown in FIGS. 2, 5, and 10, a document holder 156 may be coupled to an exterior surface of the recessed portion 154. The recessed portion 154 may be set back with sufficient depth so that in the fully opened condition, the left-hand door 112 may be secured by the door catch 120 and be fully received within the recessed portion 152 without any interferences between the left-hand door 112 and the document holder 156 or any documents received by the document holder 156.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An enclosed medical case cart, comprising:
a left-side panel, a back panel, and a right-side panel supported on a chassis;
a top panel supported on the left-side panel, the back panel, and the right-side panel opposite the chassis;
a door coupled to either the left-side panel or the right-side panel by a hinge, the door including a transparent panel;
a plurality of freely-swiveling caster wheels coupled to the chassis;
a first status indicator assembly coupled to the top panel, the first status indicator assembly comprising a plurality of flags, each flag movable between a first position and a second position, wherein the flag protrudes above the top panel in the first position and does not protrude above the top panel in the second position; and
a second status indicator assembly coupled to a surface of the door, the second status indicator assembly comprising an indicator disc, a cover plate disposed over the indicator disc and comprising a first vertical extension and a second vertical extension, wherein the indicator disc is positioned between the cover plate and the door, and wherein the indicator disc is movable between a first position and a second position to indicate a first status in the first position and a second status in the second position.

2. The enclosed medical case cart of claim 1,
wherein each flag of the plurality of flags is pivotable between the first position and the second position relative to a mounting bracket of the first status indicator assembly;
wherein each flag of the plurality of flags comprises a magnet; and
wherein each flag of the plurality of flags is magnetically coupled to the mounting bracket in at least one of the first position and the second position.

3. An enclosed medical case cart, comprising:
a left-side panel, a back panel, and a right-side panel supported on a chassis;
a top panel supported on the left-side panel, the back panel, and the right-side panel opposite the chassis;
a door coupled to either the left-side panel or the right-side panel by a hinge, the door including a transparent panel;
a plurality of wheels coupled to the chassis;
a first status indicator assembly coupled to the top panel, the first status indicator assembly comprising a plurality of flags, each flag movable between a first position and a second position, wherein the flag protrudes above the top panel in the first position and does not protrude above the top panel in the second position;
wherein each flag of the plurality of flags comprises a mounting portion having a first aperture therethrough;
wherein the first status indicator assembly further comprises:
a mounting bracket having a base, a flange, and a wall offset from the base; and
a rod received through a second aperture formed in the flange of the mounting bracket and the first aperture formed through the mounting portion of the flag;
wherein each flag of the plurality of flags is pivotable about the rod between the first position and the second position; and
a second status indicator assembly coupled to a surface of the door, the second status indicator assembly comprising an indicator disc movable between a first position and a second position.

4. The enclosed medical case cart of claim 3, wherein each flag comprises a recess proximate the mounting portion and a magnet disposed in the recess and sealed from an outside environment.

5. The enclosed medical case cart of claim 4, wherein a portion of the flag is in contact with the wall in the first position and is in contact with the base in the second position.

6. The enclosed medical case cart of claim 5, wherein the magnet couples the flag to the wall in the first position and couples the flag to the base in the second position.

7. The enclosed medical case cart of claim 3, wherein each flag is coupled to the mounting bracket by a friction hinge, wherein the friction hinge is configured to retain the flag in the first position or the second position.

8. The enclosed medical case cart of claim 1, wherein:
the indicator disc comprises a tab;
the tab is in contact with the first vertical extension when the indicator disc is in the first position; and
the tab is in contact with the second vertical extension when the indicator disc is in the second position.

9. The enclosed medical case cart of claim 8, wherein:
the indicator disc comprises a first side opposite a second side;
a portion of a first half of the first side of the indicator disc is visible below an edge of the cover plate and a portion of a first half of the second side of the indicator disc is visible through the transparent panel when the indicator disc is in the first position; and
a portion of a second half of the first side of the indicator disc is visible below the edge of the cover plate and a portion of a second half of the second side of the indicator disc is visible through the transparent panel when the indicator disc is in the second position.

10. The enclosed medical case cart of claim 9, wherein:
the cover plate occludes the second half of the first side of the indicator disc and an edge of the door occludes the second half of the second side of the indicator disc when the indicator disc is in the first position; and
the cover plate occludes the first half of the first side of the indicator disc and the edge of the door occludes the first half of the second side of the indicator disc when the indicator disc is in the second position.

11. The enclosed medical case cart of claim 1, further comprising a fifth-wheel assembly coupled to the wheeled chassis, the fifth-wheel assembly comprising a non-swiveling wheel and a foot pedal coupled to the non-swiveling wheel, the foot pedal movable between a first position and a second position, wherein the non-swiveling wheel is raised in the first position and lowered to be in contact with a ground in the second position.

12. The enclosed medical case cart of claim 1, wherein the right-side panel further comprises:
a recessed portion formed by a plurality of walls; and
a swing-up handle pivotally coupled to the plurality of walls, an end of the swing-up handle configured to rotate out of the recessed portion.

13. An enclosed cart, comprising:
a left-side panel, a back panel, and a right-side panel supported on a wheeled chassis;
a top panel supported on the left-side panel, the back panel, and the right-side panel to define a cabinet;
a left-hand door hingedly coupled to the left-side panel;
a right-hand door hingedly coupled to the right-side panel, the right-hand door comprising a transparent panel;
a plurality of caster wheels coupled to the wheeled chassis;
a first status indicator assembly coupled to the top panel, the first status indicator assembly comprising:
a bracket having a base, a flange, and a wall, the wall being offset from the base,
a flag having a first end opposite a second end, the flag pivotally coupled to the flange at the second end, and
a magnet coupled to the flag at the second end,
wherein the flag pivots between a first position and a second position, wherein the first end is positioned below the top panel in the first position and raised above the top panel in the second position, wherein the magnet couples the flag to the base in the first position, wherein the magnet couples the flag to the wall in the second position; and
a second status indicator assembly coupled to a surface of the right-hand door, the second status indicator assembly comprising:
an indicator disc having a first side and a second side, the indicator disc positioned between a cover plate and the surface of the right-hand door,
wherein the indicator disc includes a tab,
wherein the cover plate includes a first vertical portion and a second vertical portion, and occludes a top half of the first side of the indicator disc,
wherein a portion of a bottom half of the first side of the indicator disc is visible below a lower edge of the cover plate, and
wherein a portion of the bottom half of the second side of the indicator disc is visible through the transparent panel.

14. The enclosed cart of claim 13, further comprising a fifth-wheel assembly coupled to the wheeled chassis, the fifth-wheel assembly comprising a non-swiveling wheel and a foot pedal coupled to the non-swiveling wheel, the foot pedal movable between a first position and a second position to raise the non-swiveling wheel in the first position and lower the non-swiveling wheel in the second position.

15. An enclosed case cart, comprising:
a top panel supported above a chassis by a left-side panel, right-side panel, and a back panel;
a door hingedly coupled to the right-side panel;
a plurality of wheels coupled to the chassis;
a first status indicator assembly coupled to the top panel, the first status indicator assembly comprising a flag, the flag movable between a first position and a second position, the flag protruding above the top panel in the first position and not protruding above the top panel in the second position; and
a second status indicator assembly coupled to an exterior surface of the door, the second status indicator comprising an indicator disc, the indicator disc movable between a first position and a second position to indicate a status;
wherein the second status indicator comprises a cover plate disposed over the indicator disc such that the indicator disc is positioned between the cover plate and the door; and
wherein the cover plate comprises a first vertical portion and a second vertical portion.

16. The enclosed case cart of claim 15, further comprising a decal disposed on the indicator disc, the decal facing away from the exterior surface of the door.

17. The enclosed case cart of claim 16, wherein a diameter divides the decal into a first half and a second half.

18. The enclosed case cart of claim 17, wherein:
the indicator disc comprises a tab;
the tab is in contact with the first vertical portion in the first position;
the tab is in contact with the second vertical portion in the second position;

a part of the first half of the decal is visible below a bottom edge of the cover plate; and the cover plate occludes the second half of the decal.

19. The enclosed case cart of claim 18, wherein:

the first status indicator assembly is coupled to the top panel by a mounting bracket;

wherein the flag is pivotable between the first position and the second position relative to the mounting bracket;

wherein the flag comprises a magnet; and wherein the flag is magnetically coupled to the mounting bracket in at least one of the first position and the second position.

20. The enclosed case cart of claim 18, wherein:

the first status indicator assembly is coupled to the top panel by a mounting bracket;

wherein the flag is coupled to the mounting bracket by a friction hinge;

wherein the flag is pivotable between the first position and the second position relative to the mounting bracket; and wherein the friction hinge is configured to retain the flag in at least one of the first position and the second position.

\* \* \* \* \*